(12) United States Patent
Ikeda

(10) Patent No.: US 10,585,288 B2
(45) Date of Patent: *Mar. 10, 2020

(54) COMPUTER DISPLAY DEVICE MOUNTED ON EYEGLASSES

(71) Applicant: Hiroyuki Ikeda, Tokyo (JP)

(72) Inventor: Hiroyuki Ikeda, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/214,596

(22) Filed: Dec. 10, 2018

(65) Prior Publication Data

US 2019/0107724 A1   Apr. 11, 2019

Related U.S. Application Data

(63) Continuation of application No. 14/809,420, filed on Jul. 27, 2015, now Pat. No. 10,191,282.

(30) Foreign Application Priority Data

Jul. 25, 2014  (JP) .................................. 2014-152019
May 29, 2015  (JP) .................................. 2015-110240

(51) Int. Cl.
   *G02B 27/01*   (2006.01)
   *G06F 3/01*    (2006.01)
   (Continued)

(52) U.S. Cl.
   CPC ....... *G02B 27/0172* (2013.01); *G02B 27/017* (2013.01); *G06F 3/01* (2013.01);
   (Continued)

(58) Field of Classification Search
   CPC ........ G02B 27/0172; G02B 2027/0178; G06F 3/01; G06F 3/017; G06F 3/0346;
   (Continued)

(56) References Cited

U.S. PATENT DOCUMENTS

2009/0267921 A1   10/2009 Pryor
2010/0156787 A1   6/2010 Katayama
(Continued)

FOREIGN PATENT DOCUMENTS

JP   H075978 A    1/1995
JP   H07110735 A  4/1995
(Continued)

OTHER PUBLICATIONS

Applicant's Request for Accelerated Examination filed on May 30, 2016 in related JP application No. 2015-110240, and machine translation thereof.
(Continued)

*Primary Examiner* — Sahlu Okebato
(74) *Attorney, Agent, or Firm* — J-Tek Law PLLC; Jeffrey D. Tekanic

(57) ABSTRACT

When an imaging apparatus (30) captures an image of a finger performing an operation on a visual confirmation screen (S2), an operation determining unit (73) of a computer display device (1) mounted on eyeglasses (10) determines the contents of the operation performed by the finger based on image data obtained by the imaging apparatus (30). A positional data generating unit (74) generates positional data of the finger based on the image data. Based on data concerning the determined contents of the operation performed by the finger, the generated positional data of the finger, and reference data concerning the visual confirmation screen stored in a storage unit (90), an input control unit (76) determines the contents of an inputted instruction corresponding to the operation performed by the finger, and controls an original screen to be displayed on an display apparatus (20) in accordance with the determined contents of the inputted instruction.

10 Claims, 23 Drawing Sheets

(51) Int. Cl.
*G06F 3/042* (2006.01)
*G06F 3/0481* (2013.01)
*G06F 3/0346* (2013.01)
*G06F 3/041* (2006.01)
*G06F 3/0488* (2013.01)

(52) U.S. Cl.
CPC ............ *G06F 3/017* (2013.01); *G06F 3/0346* (2013.01); *G06F 3/0418* (2013.01); *G06F 3/0426* (2013.01); *G06F 3/0481* (2013.01); *G06F 3/04815* (2013.01); *G06F 3/04883* (2013.01); *G06F 3/04886* (2013.01); *G02B 2027/0138* (2013.01); *G02B 2027/0178* (2013.01)

(58) Field of Classification Search
CPC .... G06F 3/0418; G06F 3/0426; G06F 3/0481; G06F 3/04815; G06F 3/04883; G06F 3/04886
See application file for complete search history.

(56) References Cited

U.S. PATENT DOCUMENTS

| | | |
|---|---|---|
| 2011/0012874 A1 | 1/2011 | Kurozuka |
| 2011/0221656 A1 | 9/2011 | Haddick et al. |
| 2014/0115520 A1 | 4/2014 | Itani |
| 2014/0160129 A1 | 6/2014 | Sako et al. |
| 2015/0009103 A1 | 1/2015 | Ito et al. |
| 2016/0140768 A1 | 5/2016 | Sako et al. |

FOREIGN PATENT DOCUMENTS

| | | |
|---|---|---|
| JP | H08160340 A | 6/1996 |
| JP | H11098227 | 9/1999 |
| JP | 2008009490 A | 1/2008 |
| JP | 2009251154 A | 10/2009 |
| JP | 2010145860 A | 7/2010 |
| JP | 2013190926 A | 9/2013 |
| JP | 2013206412 A | 10/2013 |
| JP | 2014056462 A | 3/2014 |
| JP | 2014115457 A | 6/2014 |
| WO | 2009101960 A1 | 8/2009 |
| WO | 2009133698 A1 | 11/2009 |
| WO | 2013009482 A2 | 1/2013 |

OTHER PUBLICATIONS

Examination Report from the European Patent Office dated Oct. 4, 2018 in related EP application No. 15 178 479.0, including grounds for rejection and examined claims 1-13.
Extended European Search Report from the European Patent Office dated Oct. 22, 2015 in related EP application No. 15 178 479.0, including European Search Opinion, European Search Report, and examined claims 1-13.
Office Action from the Japanese Patent Office dated Jun. 23, 2016 in related Japanese application No. 2015-110240, and translation of substantive portions thereof.

FIG.22A
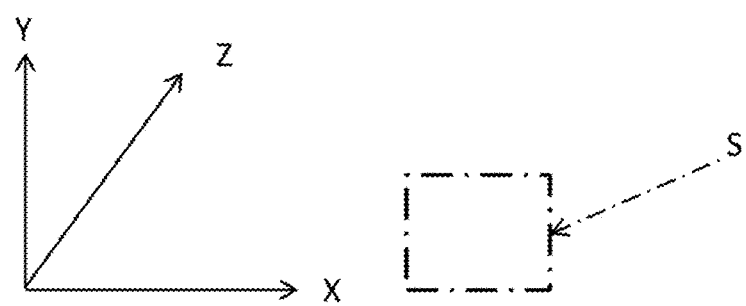
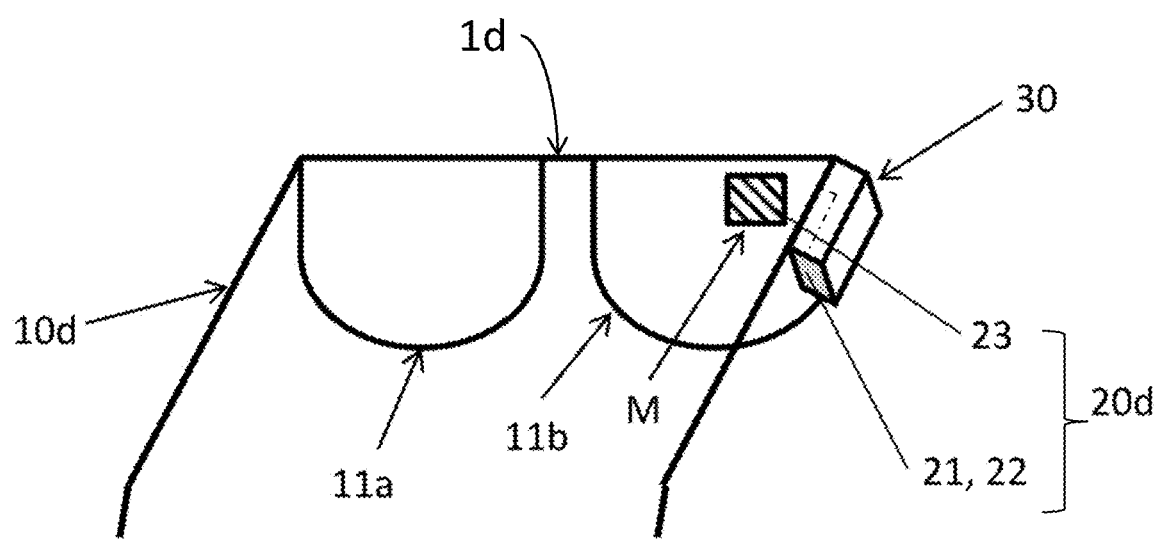
FIG.22B
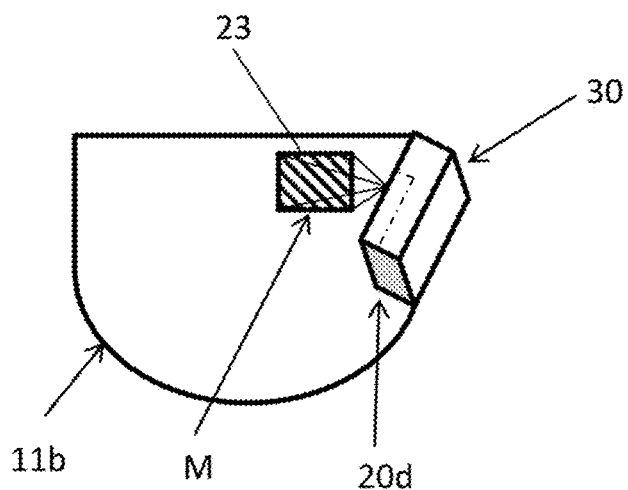

COMPUTER DISPLAY DEVICE MOUNTED ON EYEGLASSES

CROSS-REFERENCE TO RELATED APPLICATIONS

The present application is a continuation application of U.S. patent application Ser. No. 14/809,420, now pending, which claims priority to Japanese patent serial number 2014-152019 filed on Jul. 25, 2014 and to Japanese patent application serial number 2015-110240 filed on May 29, 2015, the contents of both of which are incorporated fully herein.

TECHNICAL FIELD

The present invention generally relates to wearable computers, such as computer display devices mountable on eyeglasses (eyeglass-type computer devices), "smartglasses", head-mounted displays, optical head-mounted displays, etc.

BACKGROUND ART

In recent years, wearable computers, such as computer display devices mounted on eyeglasses, including Google Glass™ made by Google Inc., have been developed and marketed; see also Japanese Patent Application Laid-open No. H11-98227. In a Google Glass device, an ultra-small display that uses a prism is arranged in front of the right eyeglass of the eyeglass frame (main body), enabling the Google Glass user to simultaneously view a virtual screen displayed on the display together with the real surroundings of the user. For example, by wearing this type of computer display device, the user can walk around town while viewing information, such as a map of the neighborhood, displayed on a virtual screen that appears to be floating in the peripheral vision of the user's right eye. In addition, for example, stores, restaurants, etc. in the vicinity of the user can display advertisements on the screen for the user.

SUMMARY OF THE INVENTION

With currently developed and marketed computer display devices mounted on eyeglasses (smartglasses), however, in order to operate a displayed (virtual) screen, the user issues a voice command or taps a touchpad provided at a base (side) portion of the eyeglass frame. However, when inputting characters into a visual (virtual) confirmation screen using, for example, a voice command, not everyone can achieve accurate character input because languages have a large number of homonyms and thus vocalization results in individual pronunciation differences that may not be accurately understood by the speech recognition software. In addition, the touchpad provided on the eyeglass frame is not large enough to enable manual character input. Therefore, known computer display devices mounted on eyeglasses s suffer from the problem that performing character input for an e-mail, etc. using a virtual screen displayed in the user's field of vision is difficult.

An object of the present teachings is to provide computer display devices mounted on eyeglasses, smartglasses, wearable computers, etc. that enable operations, such as character input on a virtual screen displayed in the user's field of vision, to be performed easily and accurately.

A first aspect of the present teachings is provided in appended claim 1.

With such a device, when the user performs an operation using a finger or an input instructing tool on the visual (virtual) confirmation screen, the input control unit recognizes the contents of the inputted instructions corresponding to the operation performed by the finger or the input instructing tool based on (i) data concerning the contents of the operation performed by the finger or the input instructing tool as determined by the operation determining unit, (ii) the positional data of the finger or the input instructing tool generated by the positional data generating unit, and (iii) the reference data concerning the visual confirmation screen stored in a storage unit, and controls the original screen to be displayed on the display apparatus in accordance with the recognized contents of the inputted instruction. Therefore, by performing, on a visual confirmation screen that appears as though it is floating in midair, an operation (a virtual manual operation) similar to a manual (touch) operation performed on a screen displayed on a conventional touch panel or touch screen (e.g., a smartphone or a tablet computer), the user can input an instruction corresponding to the manual operation. Consequently, by using the device according to appended claim 1, the user can easily and accurately perform character input operations and various screen operations, including enlargement and reduction, by operating (manipulating) a visual (virtual) confirmation screen in a manner to similar a conventional smartphone display or a tablet screen.

In addition or in the alternative, a second aspect of the present teachings is provided in appended claim 5.

With such a device, when the user performs an operation using a finger or an input instructing tool on the visual confirmation screen and the distance determining unit determines that the finger or the input instructing tool is at a position within a range of an approximately constant distance from the reference screen, the input control unit recognizes the contents of the inputted instruction corresponding to the operation performed by the finger or the input instructing tool based on (i) the data concerning the contents of the operation performed by the finger or the input instructing tool as determined by the operation determining unit, (ii) the positional data of the finger or the input instructing tool generated by the positional data generating unit based on image data used by the operation determining unit to make the determination, (iii) the distance data associated with the image data used by the operation determining unit to make the determination, and (iv) the reference data that specifies a reference screen that is stored in a storage unit and corresponds to the visual confirmation screen, and controls an original screen to be displayed on the display apparatus in accordance with the recognized contents of the inputted instruction. Therefore, by performing, on the visual (virtual) confirmation screen that appears to be floating in midair, a manual (virtual touch) operation similar to a manual operation performed on a screen displayed on a conventional touch panel or touch screen (e.g., a smartphone or tablet computer), the user can input an instruction corresponding to the manual operation. Consequently, by using the device according to the appended claim 5, the user can easily and accurately perform character input operations and various screen operations, including enlargement and reduction, by operating a visual (virtual) confirmation screen in a manner similar to a conventional smartphone display or a tablet screen. In addition, since the reference data generating unit generates data, which specifies the reference screen that corresponds to the visual confirmation screen in a three-dimensional space, as reference data, even if the user has a habit of, when manually operating (virtually manipulating)

the visual confirmation screen, operating (touching) at positions on a near side with respect to the two left-side corners of the visual confirmation screen and operating (touching) at positions on a far side with respect to the two right-side corners of the visual confirmation screen, reference data conforming to such a habit can be generated.

With computer display devices mounted on eyeglasses according to the present teachings, various screen operations such as character input and enlargement and reduction can be easily and accurately performed on a visual confirmation screen displayed in the user's field of vision.

BRIEF DESCRIPTION OF THE DRAWINGS

FIG. 22A is a schematic perspective view of a computer display device mounted on eyeglasses according to a modification of the first embodiment, and FIG. 22B is a schematic view that explains an embodiment in which the original screen is projected on a display apparatus;

DESCRIPTION OF THE PREFERRED EMBODIMENTS

Figure 1A:
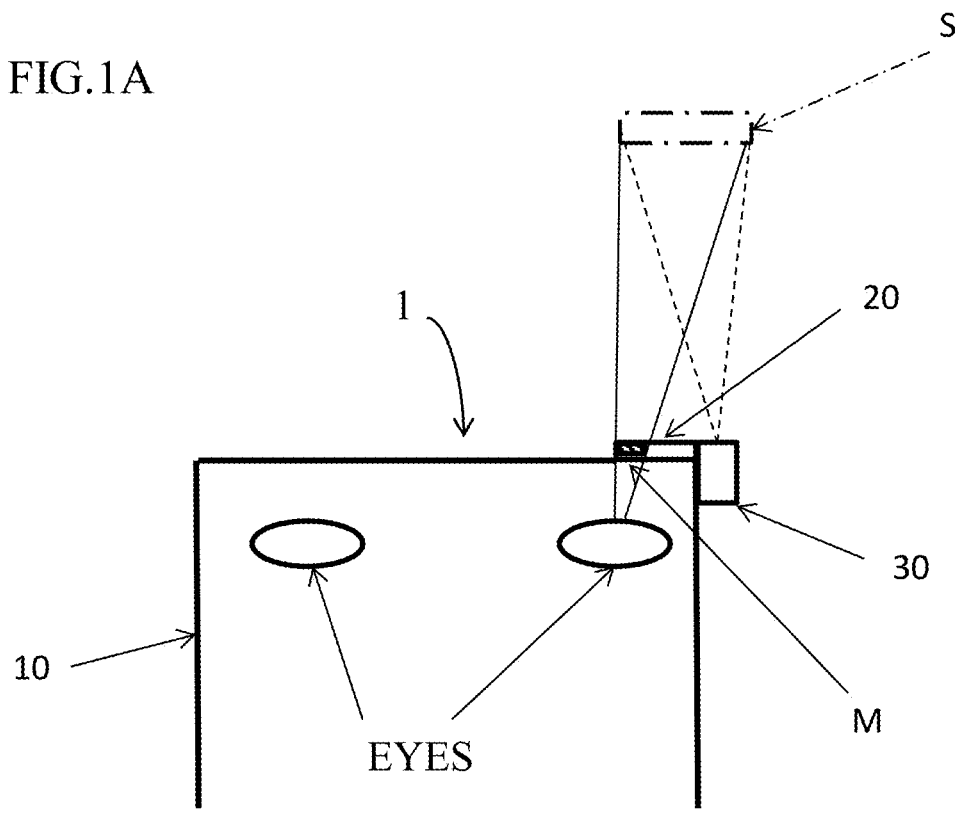
FIG. 1A is a schematic plan view of a computer display device mounted on eyeglasses according to a first embodiment of the present teachings.

Hereinafter, various embodiments of the present teachings will be described with reference to the drawings.

First Embodiment

A computer display device mounted on eyeglasses according to a first embodiment of the present teachings will be described first with respect to FIGS. 1-3.

The computer display device according to the first embodiment may be generally constructed in the manner, for example, of a Google Glass™ manufactured by Google Inc., which the user can wear like eyeglasses (spectacles). As shown in FIGS. 1 to 3, the computer display device 1 includes an eyeglass main body (eyeglass frame) 10 having two lens sections (lenses) 11, a display apparatus 20 provided on the eyeglass main body 10, an imaging apparatus 30 for capturing (sensing, recording, detecting, etc.) an image in front of the user, a touchpad unit 40, a microphone unit 50, a speaker unit 60, a control unit 70, a communicating unit 80, and a storage unit (also referred to as storage and/or memory) 90. It is noted that, in the further description of the embodiments, the computer display device 1 mounted on eyeglasses may also be referred to simply as a computer display device 1.

Figure 2:
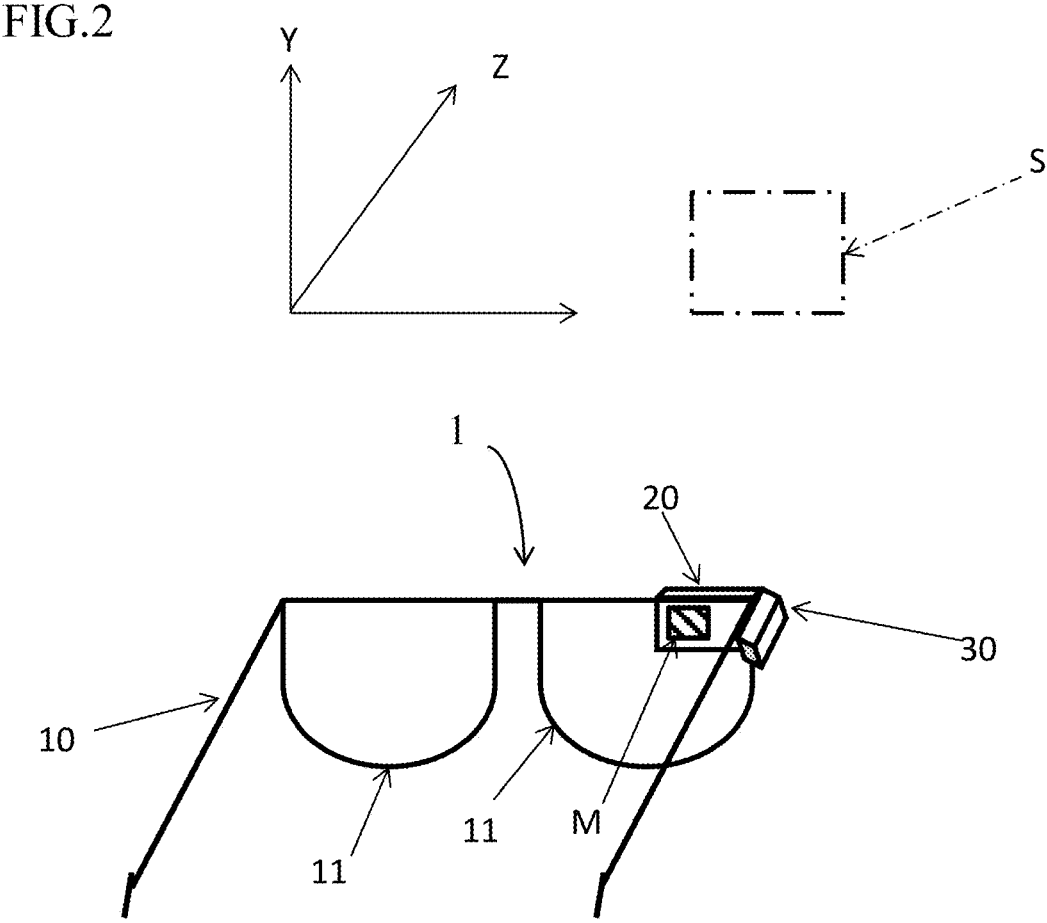
FIG. 2 is a schematic perspective view of the computer display device according to the first embodiment.

As shown in FIG. 2, the eyeglass main body 10 may comprise a conventional eyeglass frame having two lens sections (lens holders or rims) 11 and two temples (arms) attached, e.g., pivotably attached, thereto. Lenses mounted in the lens sections (lens holders or rims) 11 may be convex lenses or concave lenses for correcting eyesight or may be lenses made of ordinary glass, plastic, or the like without an eyesight correcting function. Alternatively, lenses may be omitted.

The display apparatus 20 may be a transmissive prism display. For example, the display apparatus 20 may comprise a small projector including a liquid crystal panel (display device) or the like, an optical system, and a half mirror. In such an embodiment, as shown in FIGS. 1 and 2, the half mirror is embedded in a prism arranged on the eyeglass main body 10 (e.g. on the frame) in front of the lens section 11 of the right eye. An image or a video displayed on the liquid crystal panel is projected onto the half mirror via the optical system. In actual practice, a very small screen is displayed on the display apparatus 20 (half mirror). By using the computer display device 1, a user can view a translucent screen (virtual screen/display) that is an image of the very small screen displayed on the display apparatus 20 (half mirror) as though the translucent screen is floating in midair. From the perspective of the user, the translucent screen that appears to be floating corresponds to (has the same apparent size as) a 25 inch (63.5 cm) screen when viewed from a distance of 8 feet (2.44 m). Although the present embodiment includes a translucent screen that appears to be floating, generally speaking, the screen need not be translucent. In addition, although the floating screen of the first embodiment is displayed at an upper right position in the user's field of vision as shown in FIGS. 1 and 2, generally speaking, the screen may be displayed at a center position, an upper left position, a lower right position, or the like of the user's field of vision. In the following description, the very small screen displayed on the display apparatus 20 (half mirror) will also be referred to as the "original screen" and the screen that appears to the user of the computer display device 1 to be floating in midair will also be referred to as the "visual confirmation screen". The visual confirmation screen is a virtual screen that appears to be projected in front of the user and is viewable by the user to read information, as well as to manually input instructions (commands) in the manner described below.

Figure 4:
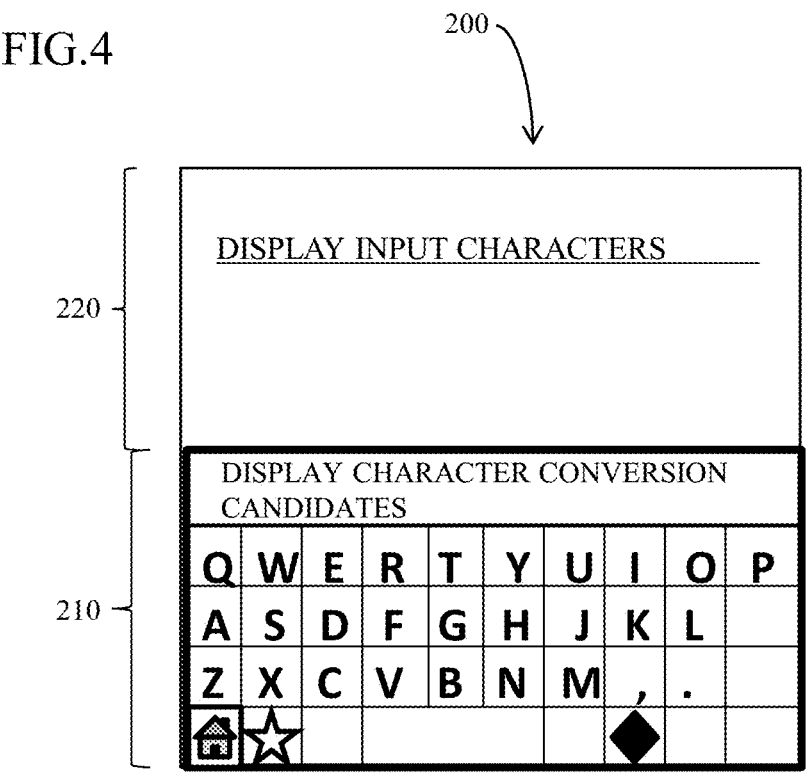
FIG. 4 is a diagram showing an example of a character input screen.
Figure 5:
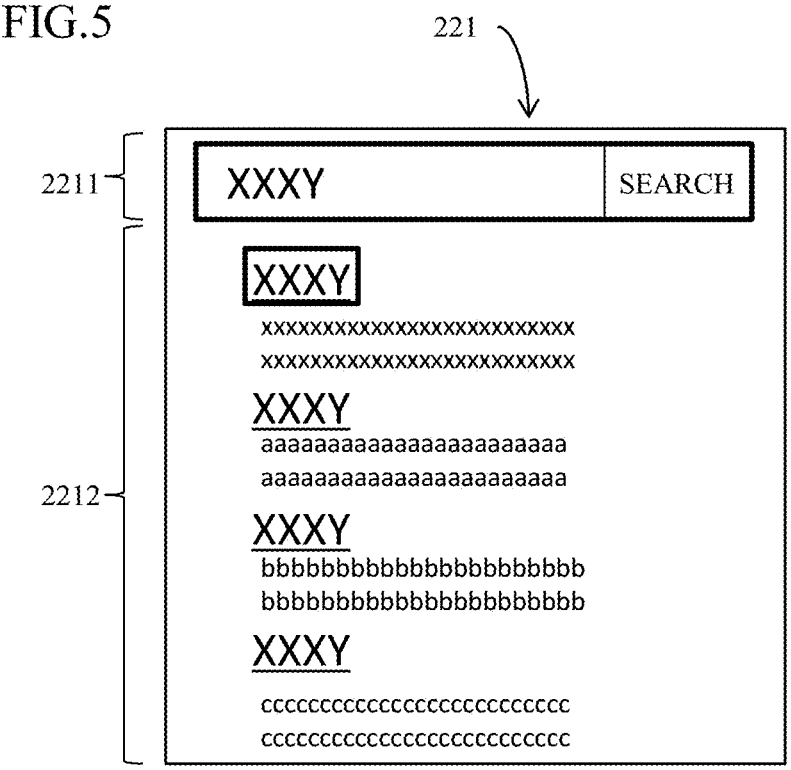
FIG. 5 is a diagram showing an example of a search screen that is displayed on a character input screen.

For example, various screens (screen images or display images) containing a character input screen may be displayed on the display apparatus 20. FIG. 4 is a diagram showing an example of a representative, non-limiting character input screen. As shown in FIG. 4, the character input screen 200 includes a keyboard image 210 and a display area 220 for displaying the inputted characters, etc. The keyboard image 210 includes a plurality of character key images respectively associated with alpha-numeric characters, punctuation marks, symbols, etc. and a plurality of function key images to which specific functions are assigned. In the example shown in FIG. 4, the QWERTY keyboard layout is adopted as the layout of the character key images in the keyboard image 210. Alternatively, the keyboard image 210 may be, e.g., a keyboard image in the layout of the Japanese syllabary, a keyboard image depicting characters for a non-English language (or a language that uses alpha-numeric characters other than Roman letters and/or Arabic numerals), a ten-key image, a key image similar to a key layout of a mobile phone, or the like. In addition, a search screen may be displayed in the display area 220. FIG. 5 shows an example of a search screen 221 that may be displayed on the character input screen 200. The search screen 221 is designed for searching/selecting Internet web sites and includes a keyword input section 2211 and a search result display section 2212 that displays the search results. When the user is viewing the character input screen 200 as the visual confirmation screen S, the user can input a keyword into the keyword input section 2211 using key images (character keys) of the keyboard image 210.

In the first embodiment, the user can give (input) various instructions to (into) the control unit 70 by using a finger to perform a touch (manual) operation (virtual touch) on the visual confirmation screen S. As will be described below, the control unit 70 recognizes (detects, determines, analyzes) the contents (specifics, intention) of the instruction and, in accordance with the recognized (detected, determined, analyzed) contents of the instruction, controls (selects, generates) the original screen M that is displayed on the display apparatus 20. In this embodiment, it is assumed that the touch operation encompasses various types of manually-performed operations including, without limitation, a tapping operation, a double-tapping operation, a long-tapping operation, a dragging operation, a flicking operation, a pinching-in operation, and a pinching-out operation, in a similar manner to touch operations performed on conventional touch panels or touch screens, e.g., smartphones or tablet computers.

Figure 1B:
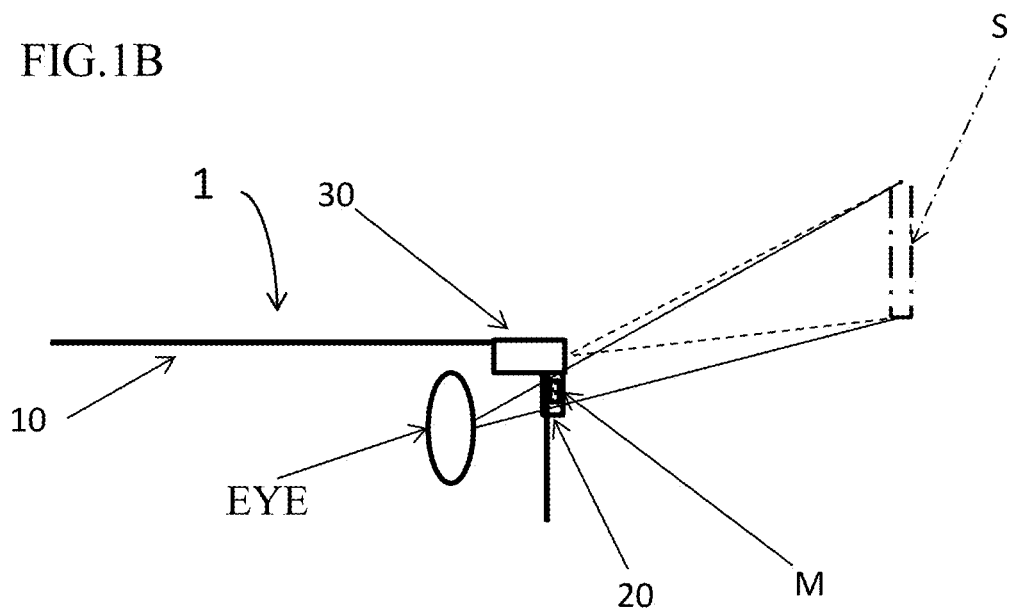
FIG. 1B is a schematic right side view of the same.

As shown in FIGS. 1 and 2, the imaging apparatus 30 is provided (disposed) on the frame or, e.g., on one of the temples, of the eyeglass main body 10 adjacent to the display apparatus 20. As shown in FIG. 3, the imaging apparatus 30 includes a camera unit 31, an image processing unit 32, and a camera control unit 33. The camera unit 31 includes a lens and an imaging element, such as a charge-coupled device (CCD) or a CMOS active-pixel sensor, e.g., a digital camera. Based on image data obtained by performing an imaging operation using the camera unit 31, the image processing unit 32 performs, e.g., one or more of: a correction process of color or gradation of the captured image, image processing such as compression of the image data, etc. The camera control unit 33 controls the image processing unit 32 and controls the exchange (transfer) of image data with (to) the control unit 70. It is noted that, although the present embodiment provides the image processing unit 32 in the imaging apparatus 30, the image processing unit 32 may alternatively be provided in the control unit 70.

In addition, the imaging apparatus 30 may be designed to image or capture only a part of the visual field or field of vision, or approximately the entire visual field or field of vision, of the user as the imaging range of the imaging apparatus 30. In particular, in the first embodiment, the imaging apparatus 30 is configured such that a subject (object) at the position (in the plane) of the visual confirmation screen S as recognized by the user or, specifically the position of the user's finger when the user reaches out with his/her hand to virtually touch the visual confirmation screen S and which (position or plane) is separated from the imaging apparatus 30 by an approximately constant distance along a depth direction, is brought into focus. In addition, the in-focus range (depth of field) is limited to a narrow range. For example, the in-focus position (depth) is set to a position (depth) that is separated by approximately 40 cm from the imaging apparatus 30; the depth of field thereof is a range of approximately 5 cm around the in-focus position (depth). However, in the first embodiment, it is important to note that the imaging apparatus 30 limits the in-focus range to the narrow range only when manual operations for reference data setting, character input, and screen display are being performed, as will be discussed below. The in-focus range is not limited to a narrow range when normal photography is performed using the camera and in other situations. Moreover, the imaging apparatus 30, for example, may be designed to be capable of switching among (between) the in-focus positions by manually changing settings using a distance ring (focus ring) in a same way as a conventional camera.

As was noted above, in the first embodiment, the in-focus position in the imaging apparatus 30 is set to the position (depth) of the visual confirmation screen S as recognized by the user. Therefore, when the user is using a finger to (virtually) perform a manual operation on the visual confirmation screen S, the imaging apparatus 30 is designed to capture (detect, sense, analyze, etc.) an image of the finger performing the operation in the state where the finger is in focus. Image data obtained by the imaging operation performed by the imaging apparatus 30 is sent (transmitted) to the control unit 70 and is stored in the storage unit 90 by the control unit 70. In addition, the imaging apparatus 30 according to the first embodiment is equipped with a still-image photographing function and a moving-image photographing (video recording) function. The control unit 70 can thus acquire still image data or moving image data as necessary.

Figure 3:
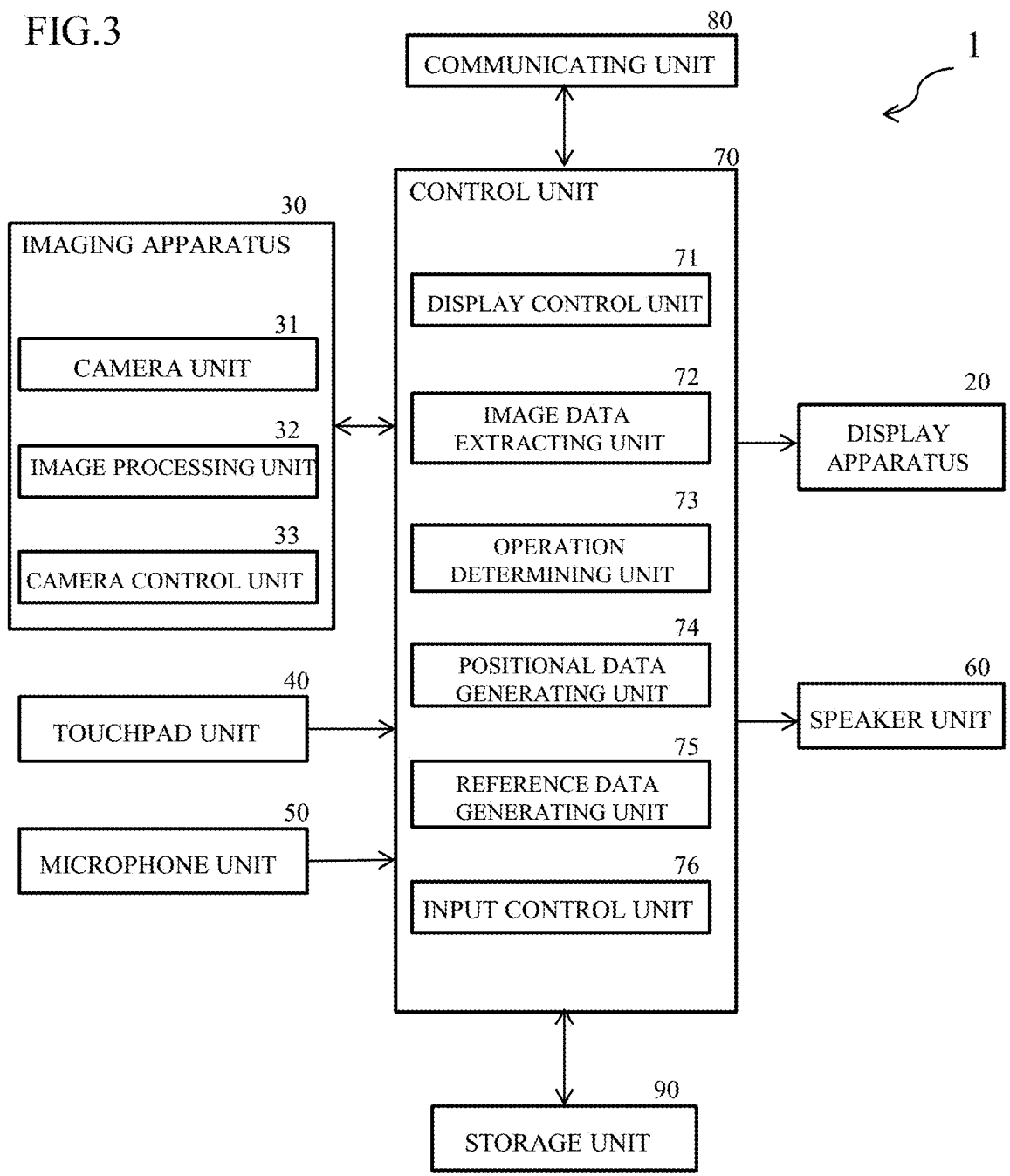
FIG. 3 is a schematic block diagram of the computer display device according to the first embodiment.

As shown in FIG. 3, the frame or temple of the eyeglass main body 10 may be provided with the touchpad unit 40, the microphone unit 50, a bone conduction speaker (transmission) unit (bone conduction headset) 60, various sensor units, a battery unit, and the like. It should be noted that these units have been omitted in FIGS. 1 and 2 for the sake of brevity and clarity. The touchpad unit 40 is used by the user to issue (input) various instructions (commands) to the control unit 70 by performing touch (manual) operations on (physically manipulating) the touchpad unit 40. The microphone unit 50 is designed for inputting the user's voice (converting audio voice commands into digital instructions) in order to operate the eyeglass main body 10 (control unit 70) by voice instructions (voice commands). Voice information input from (via) the microphone unit 50 is sent (transmitted) to the control unit 70 so that the digitized voice information is analyzed by the control unit 70. In addition, the speaker unit 60 is preferably designed for conveying voice or audio information (audible sounds) to the user, e.g., using bone vibrations or conduction. However, the speaker unit 60 may comprise a conventional speaker, an earphone, a headphone, etc. instead of a speaker that conveys voice information (audible sounds) to the user using bone vibrations. Moreover, since the various sensor units, the battery unit, and the like are not particularly pertinent to the present teachings, a detailed description of these units may be omitted in the present embodiment. Conventional technology known to the person skilled in the art may be utilized to implement these units.

The control unit 70 preferably includes a central processing unit (CPU), etc. and controls the entire computer display device 1. For example, the control unit 70 controls (selects, generates) the display of the original screen M on the display apparatus 20 and controls the imaging operation performed by the imaging apparatus 30. In addition, when the touchpad unit 40 is manually operated, the control unit 70 recognizes the contents of the manually-inputted instruction and executes one or more processes in accordance with the recognized contents (inputted instructions). Similarly, when a voice command is input from (via) the microphone unit 50, the control unit 70 recognizes the contents of the inputted voice information (command) and executes one or more processes in accordance with the recognized contents (inputted instructions). Furthermore, the control unit 70 controls (generates) the voice information or audible sounds emitted by the speaker unit 60. For example, as shown in FIG. 3, the control unit 70 may include a display control unit 71, an image data extracting unit 72, an operation determining unit 73, a positional data generating unit 74, a reference data generating unit 75, and an input control unit 76. As used anywhere in the present description, any feature described as a "unit" or an "apparatus" may be embodied, e.g., as discrete physical units, as conceptual functional units, e.g., of software code (an operating program) stored in the storage unit (memory) 90 that is executed by a microprocessor, and/or as a hybrid hardware/firmware structure. For example, the physical form of units 71-76 (as well as other "units" disclosed herein) is not particularly limited in the present teachings. Furthermore, two or more "units" may be integrated together into a single physical circuit structure, such as a CPU that is controlled by different sets of programming code (stored instructions) capable of performing the particular functions when executed by a processor, such as a microprocessor.

When the user issues a voice instruction (command) using the microphone unit 50 or inputs a keyboard instruction by operating (manipulating) the touchpad unit 40, the display control unit 71 selects (generates) the contents of the original screen M to be displayed on the display apparatus 20 and controls the display of the selected original screen M in accordance with contents of the inputted instruction. Accordingly, the original screen M instructed (requested) by the user is displayed on the display apparatus 20 and the user can view the visual confirmation screen S, which corresponds to the original screen M.

When an image of a subject (object) in focus is captured by the imaging apparatus 30 in accordance with a finger operation performed by the user on the visual confirmation screen S, the image data extracting unit 72 determines whether or not the subject (object) is the finger based on the image data obtained by the imaging and then extracts image data in which the finger is present. Known image (object) recognition methods or image recognition (object recognition) software may be used to determine whether or not the subject (object) is a finger. In the first embodiment, since the depth of field of the imaging apparatus 30 is limited to a narrow range, when the subject (object) is determined to be a finger, it is considered/deemed that the finger is at a position separated (spaced) from the imaging apparatus 30 by an approximately constant distance along the depth direction. In this manner, the image data extracting unit 72 extracts image data of the finger that is at a position separated (spaced) from the imaging apparatus 30 by an approximately constant distance along the depth direction. In addition, the operation determining unit 73, the positional data generating unit 74, and the reference data generating unit 75 are configured to perform various processes based on the image data extracted by the image data extracting unit 72, as will be discussed below.

When the imaging apparatus 30 captures an image of the finger used by the user to perform an operation on the visual confirmation screen S, the operation determining unit 73 determines the contents of the (touch) operation using the finger based on the image data obtained by the imaging operation and extracted by the image data extracting unit 72. Accordingly, the operation determining unit 73 can recognize that the operation performed by the finger is, e.g., any one of a tapping operation, a double-tapping operation, a long-tapping operation, etc. Data concerning the contents of the recognized operation performed by the finger is stored in the storage unit 90.

When the imaging apparatus 30 captures an image of the finger used by the user to perform the (touch) operation on the visual confirmation screen S, the positional data generating unit 74 generates positional data of the finger (fingertip) in the imaging range of the imaging apparatus 30 based on the image data obtained by the imaging operation and extracted by the image data extracting unit 72. As shown in FIG. 2, the present embodiment utilizes an XY coordinate system within the imaging range of the imaging apparatus 30, wherein the horizontal direction is the X axis direction and the vertical direction is the Y axis direction. The origin of the XY coordinate system may be, for example, a lower left point in the imaging range. The positional data generating unit 74 acquires positional data of the finger in this XY coordinate system. Moreover, when it is necessary to obtain three-dimensional positional data, the depth direction is the Z axis direction, which is perpendicular to the XY coordinate system, and the Z axis direction is used to constitute or define an XYZ coordinate system.

When the user performs an operation using a finger at one or a plurality of prescribed (predetermined) positions on the visual confirmation screen S, the reference data generating unit 75 generates data concerning the visual confirmation screen S using the positional data of the finger generated by the positional data generating unit 74 based on the image data for which the operation determining unit 73 has determined that an operation at each prescribed position is a prescribed (predetermined) operation. The generated data concerning the visual confirmation screen S is stored in the storage unit 90 as reference data. For this purpose, data that enables the position and the size of the visual confirmation screen S to be specified (set) is used as the reference data. For example, when the user performs an operation using a finger with respect to the four corners of an outer frame (periphery) of the visual confirmation screen S, as will be further discussed below, the positional data of the finger at each position of the four corners can be used as the reference data. In this case, since image data extracted by the image data extracting unit 72 represents a captured image of the finger at a position separated (spaced) by an approximately constant position along the Z axis direction from the imaging apparatus 30, it is considered/deemed that the positional data of the finger at each position of the four corners represents the positional information of the finger on a plane parallel to an XY plane (approximately parallel to the body of the user) at a position separated (spaced) from the imaging apparatus 30 by the approximately constant distance along the Z axis direction. In addition, when the user performs an operation using a finger with respect to one of the four corners of the outer frame (periphery) of the visual confirmation screen S, the positional data of the finger at the one corner and data concerning the size (for example, a vertical width and a lateral width calculated or measured in advance) of the visual confirmation screen S, as obtained from data of the original image M corresponding to the visual confirmation screen S, can be used as the reference data.

When a user performs an operation on the visual confirmation screen S using a finger, the input control unit 76 recognizes (detects, analyzes) the contents of the inputted instruction (command) corresponding to the operation performed by the finger based on: (i) the data concerning the contents of the operation performed by the finger as obtained by a determination made by the operation determining unit 73, (ii) the positional data of the finger generated by the positional data generating unit 74, and (iii) the reference data concerning the visual confirmation screen S stored in the storage unit 90; then, the input control unit 76 performs a control (process or operation) so that the original screen M is displayed on the display apparatus 20 in accordance with the recognized contents of the inputted instruction (command). For example, when the visual confirmation screen S is the character input screen 200 shown in FIG. 4, the input control unit 76 can recognize the range in which the character input screen 200 viewed by the user exists within the imaging range of the imaging apparatus 30 based on the reference data concerning the visual confirmation screen S. In this case, since the input control unit 76 is aware of the configuration of the character input screen 200 in advance, the input control unit 76 can also recognize the range (span) of the keyboard image 210, the region (area) of each character key image, and the like on the character input screen 200. Therefore, for example, when the user uses a finger to perform a touch operation on a character key image in the keyboard image 210, the input control unit 76 can specify (identify) the operated ("touched") character key by checking which character key image region in the keyboard image 210, to which the position of the finger as obtained from the positional data of the finger corresponds.

Moreover, when the user uses a finger to perform an operation on the visual confirmation screen S and the input control unit 76 recognizes the contents of the inputted instruction (command) corresponding to the operation performed by the finger, the input control unit 76 may specify (identify) the position on the visual confirmation screen S operated ("touched") by the finger by first generating a reference screen, which corresponds to the visual confirmation screen S, on a virtual plane that corresponds to the imaging range of the imaging apparatus 30 using (based on) the reference data concerning the visual confirmation screen S stored in the storage unit 90. Then, the input control unit 76 may check which position of the reference screen, to which the positional data of the finger generated by the positional data generating unit 74 corresponds.

The communicating unit 80 communicates (transmits/receives) information with the outside. The storage unit 90 stores various programs, data, and the like. For example, programs stored in the storage unit 90 may include: (i) a reference data setting program for performing a reference data setting process (discussed below), (ii) a character input program for performing, when the visual confirmation screen S is the character input screen 200, a character input process based on an operation performed on the character input screen 200, and/or (iii) a screen display program for performing a screen display process including enlargement/reduction and switching of the original image M corresponding to the visual confirmation screen S based on a manual (virtual) operation performed on the visual confirmation screen S. In addition, for example, data stored in the storage unit 90 may include image data of various types of original screens M, data concerning each original screen M (specifically, data indicating sizes, shapes, contents, configurations, and the like of the various types of original screens M), and various types of image data used when creating an original screen for setting the reference data, which will be described below. Furthermore, the storage unit 90 is also used as, or contains, a working (volatile) memory (e.g., RAM).

With the computer display device 1 according to the first embodiment, when a user uses a finger to perform an operation on the visual confirmation screen S, the input control unit 76 recognizes the contents of the inputted instruction (command) corresponding to the operation performed by the finger based on (i) the data concerning the contents of the operation performed by the finger as obtained by a determination made by the operation determining unit 73, (ii) the positional data of the finger generated by the positional data generating unit 74, and (iii) the reference data concerning the visual confirmation screen S stored in the storage unit 90; the input control unit 76 then controls (selects or configures) the original screen M to be displayed on the display apparatus 20 in accordance with the recognized contents of the inputted instruction. Therefore, by performing, on the visual confirmation screen S that is viewed by the user, an operation similar to a manual operation performed on a screen displayed on a conventional touch panel (screen), the user can input an instruction (command) corresponding to the manual operation. In actual practice, when the user performs a touch operation on the visual confirmation screen S using a finger, the input control unit 76 can recognize the instruction (command) corresponding to the touch operation in a manner similar to techniques used to recognize an instruction (command) when the visual confirmation screen S is displayed on a conventional touch panel (screen). For example, when the user uses a finger to perform a double-tapping operation on the visual confirmation screen S, the input control unit 76 recognizes an instruction (command) to enlarge or reduce the original screen M corresponding to the visual confirmation screen S. Similarly, when the user uses a finger to perform a long-tapping operation on the visual confirmation screen S, the input control unit 76 recognizes an instruction (command) to display a screen of option menus as the original screen M. Moreover, when the user uses a finger to perform a dragging operation on the visual confirmation screen S, the input control unit 76 recognizes an instruction (command) to scroll and display the original screen M. In addition, when the user uses a finger to perform a touch operation on a character key image on the character input screen 200, the input control unit 76 recognizes an instruction (command) corresponding to the operation or, in other words, an input instruction of the character key and performs a process that displays the character corresponding to the inputted instruction on the original screen M in a manner similar to a character input screen 200 displayed on a touch panel.

Figure 6A:
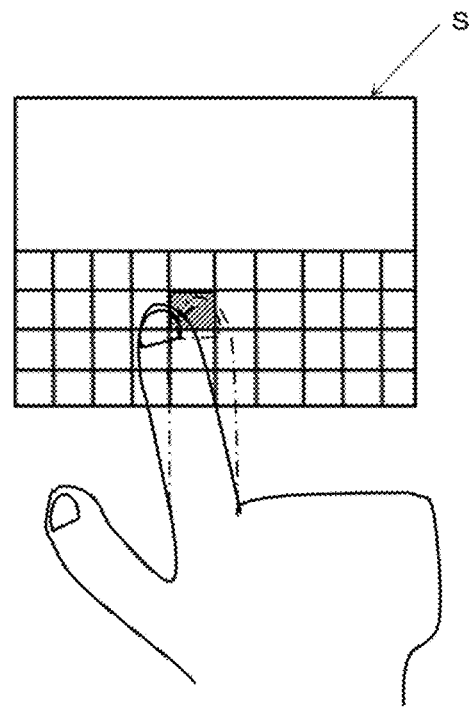
FIGS. 6A and 6B show diagrams for explaining alternate modes for performing a touch operation on a visual confirmation screen.
Figure 6B:
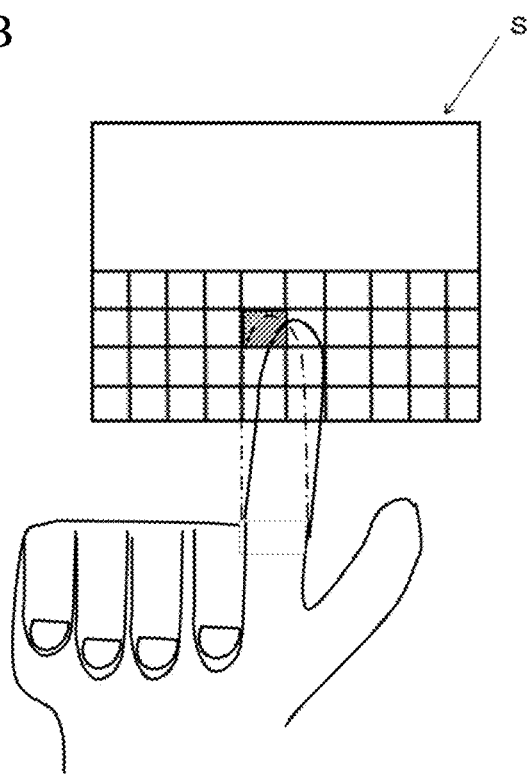
Figure 7A:
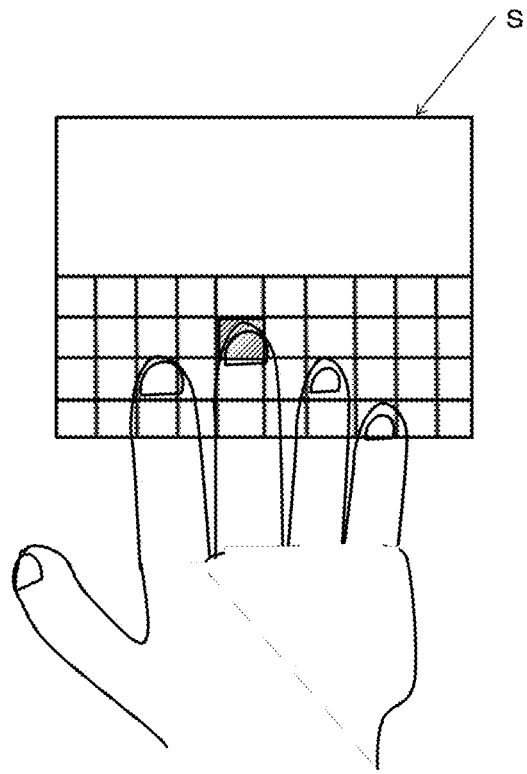
FIGS. 7A and 7B show diagrams for explaining alternate modes for performing a touch operation performed on a visual confirmation screen.
Figure 7B:
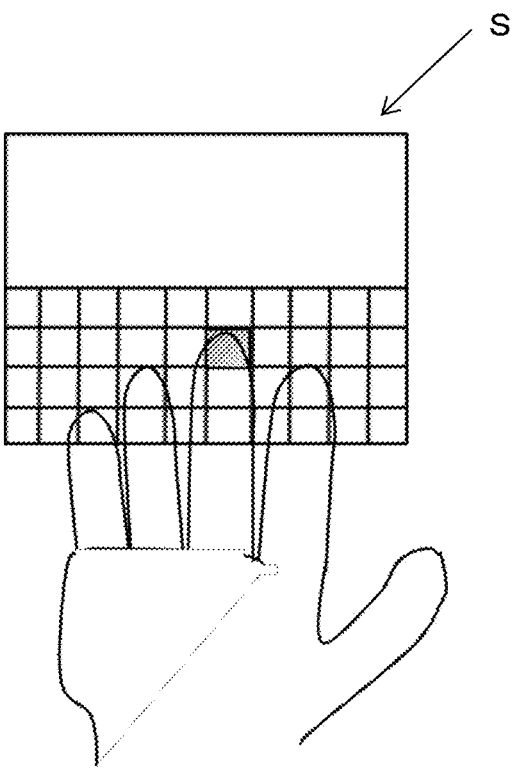

Moreover, in the first embodiment, since the user uses a finger to perform a touch operation on the visual confirmation screen S, which appears to be floating in midair, a touch operation can also be performed in a mode (manner) that cannot be employed when performing a touch operation on a screen displayed on a conventional touch panel. FIGS. 6A to 7B are diagrams that explains additional modes (types) of touch operations that can be performed on the visual confirmation screen S. That is, the user may normally or conventionally perform a touch operation using one finger from on the front side of the visual confirmation screen S as shown in FIG. 6A. However, in the present embodiment, the user can also perform a touch operation using one finger from the rear side of the visual confirmation screen S as shown in FIG. 6B. In addition, the user can also perform a touch operation using a plurality of fingers from the front side of the visual confirmation screen S as shown in FIG. 7A or can perform a touch operation using a plurality of fingers from the rear side of the visual confirmation screen S as shown in FIG. 7B.

Figure 8:
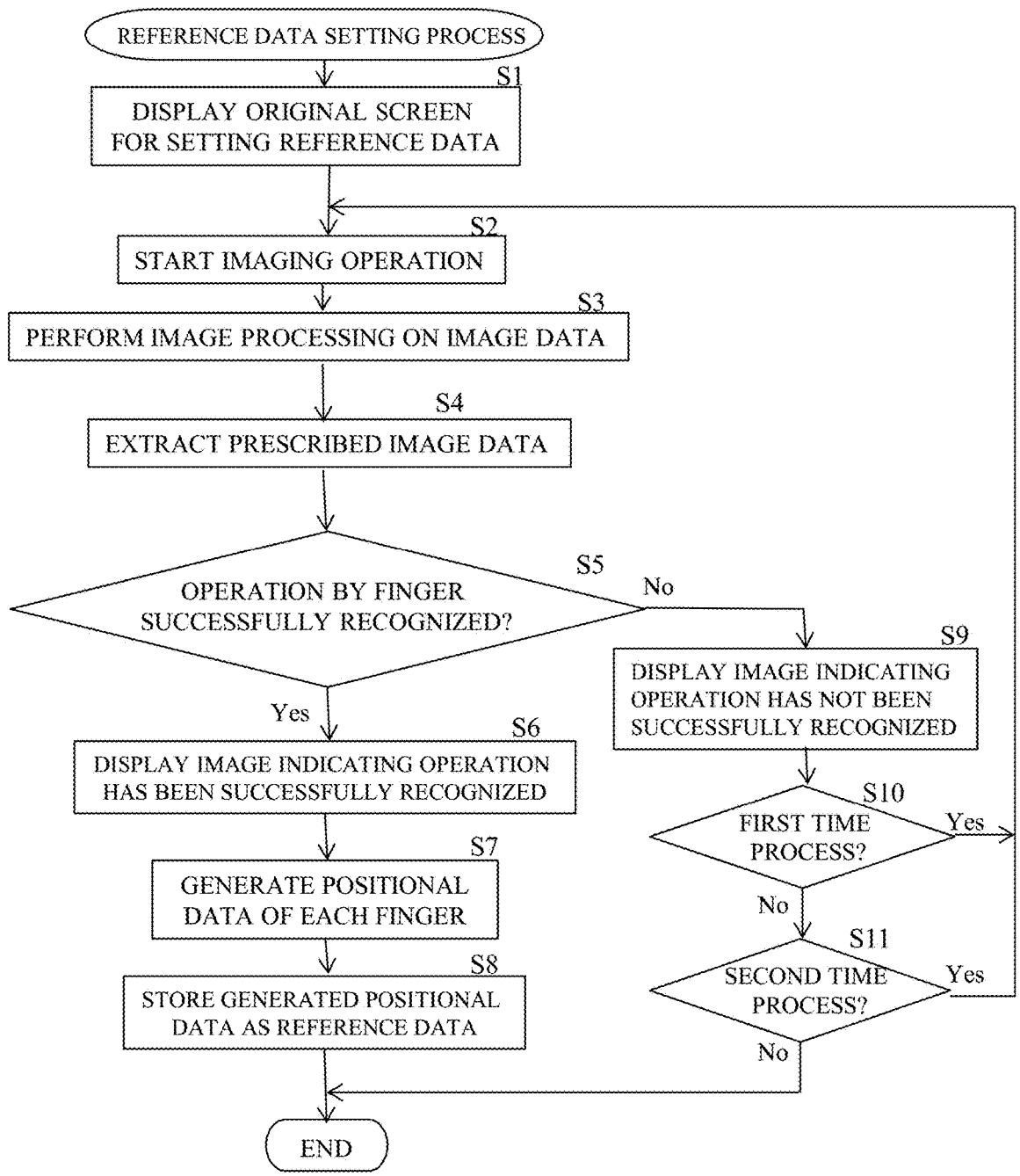
FIG. 8 is a flow chart that explains a procedure for setting reference data in the computer display device according to the first embodiment.

Next, an exemplary, non-limiting, process for setting reference data in the computer display device 1 according to the first embodiment will be described using FIG. 8, which is a flow chart that explains a representative, non-limiting procedure for a reference data setting process.

The user may, e.g., audibly (orally) issue an instruction (voice command) to set the reference data via the microphone unit 50 or may, e.g., issue an instruction to set the reference data by performing a touch operation using (by touching) the touchpad unit 40. Upon receiving such an instruction, the control unit 70 reads (accesses) the reference data setting program from the storage unit 90 and performs (executes) the reference data setting process (program) in accordance with the processing flow (steps) shown in FIG. 8.

Figure 9A:
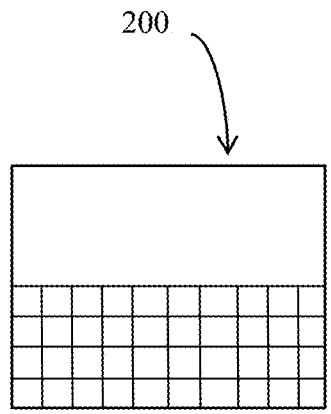
FIG. 9A-9C are diagrams that show an example of an original screen displayed during the reference data setting procedure.
Figure 9B:
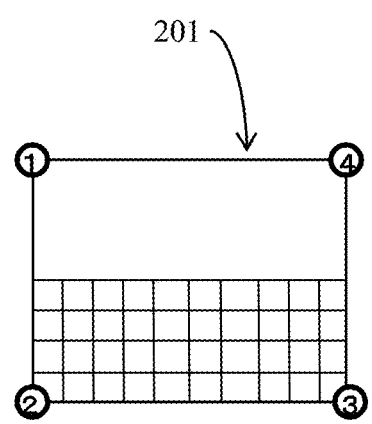
Figure 9C:
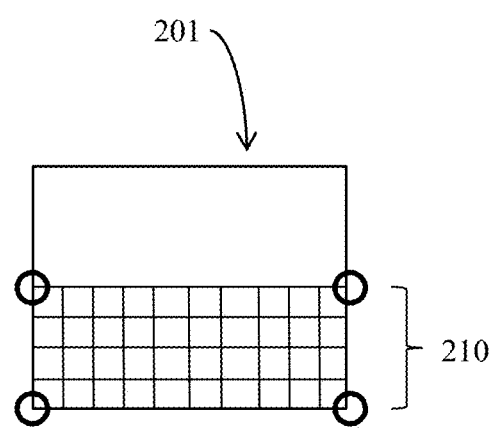

First, by adding an image of, for example, a circle at one or a plurality of prescribed positions on the original screen M currently displayed on the display apparatus 20, the display control unit 71 creates (generates) a new original screen M (original screen for setting the reference data) and displays the new original screen M on the display apparatus 20 (S1). For example, the circle image may be a mark that prompts the user to perform an operation using a finger at the position of the circle (i.e. the user should virtually touch the circle). FIGS. 9A-9C are diagrams showing an example of the original screen M that may be displayed during the process of setting the reference data. This example represents an embodiment in which the original screen M is the character input screen 200. Initially, the normal character input screen 200 shown in FIG. 9A is displayed on the display apparatus 20. However, after the process of step S1 has been executed, a modified character input screen 201 (original screen for setting the reference data) shown in FIG. 9B is displayed on the display apparatus 20. On the character input screen 201 shown in FIG. 9B, images representing circles and numerals are added to (superimposed at) the positions of the four corners of the character input screen 201. When the character input screen 201 shown in FIG. 9B is displayed on the display apparatus 20, the user can view the visual confirmation screen S corresponding to the character input screen 201 (visual confirmation screen for setting the reference data) or, in other words, a screen having the same contents as the character input screen 201 shown in FIG. 9B. It is noted that, although images of circles are displayed at the four corners of the character input screen 201 in FIG. 9B, images of circles may instead be displayed, e.g., at the four corners of the keyboard image 210 on the character input screen 201 as shown in FIG. 9C. The location of the "marks" is not particularly limited, as long as a predetermined spacing of the marks is stored in the storage unit 90 so that the control unit 70 can appropriately generate the reference data.

After the process of step S1, the control unit 70 starts an imaging operation performed by, or together with, the imaging apparatus 30 (S2). Upon viewing the character input screen 201 shown in FIG. 9B as the visual confirmation screen S for setting the reference data, the user performs a prescribed (predetermined) operation, such as a tapping operation, using a finger on the respective numbered circles in an ascending numerical order on the visual confirmation screen S to set the reference data. In this case, the user performs the prescribed operation in order to notify the control unit 70 of the positions at which the user is performing the operation. One or more images of this operation by the user is (are) captured by the imaging apparatus 30. As this point, in the present embodiment, the imaging apparatus 30 captures an image of a subject (object) in focus. In addition, the image processing unit 32 performs prescribed image processing on the image data obtained by the imaging operation; then the image data that was subjected to the image processing is sent to the control unit 70 (S3).

Next, the image data extracting unit 72 determines whether or not the subject (object) is a finger based on the image data obtained by the imaging operation performed by the imaging apparatus 30 and, if so, extracts image data in which the finger is present (S4). In this embodiment, the imaging apparatus 30 sends image data, which was obtained by capturing the subject (object) in focus, to the image data extracting unit 72. Therefore, the image data extracting unit 72 will extract image data of the finger that is at a position separated (spaced) from the imaging apparatus 30 by an approximately constant distance along the Z axis direction. Subsequently, the operation determining unit 73 determines whether or not the operation performed by the finger is a prescribed operation (in this case, a tapping operation) based on the image data extracted by the image data extracting unit 72. The operation determining unit 73 performs such a determination process to determine whether or not tapping operations performed by the finger with respect to all four circles have been successfully (normally) recognized (S5). For example, the operation determining unit 73 determines that tapping operations performed by the finger with respect to all four circles were not successfully (normally) recognized when a determination that the operation performed by the finger is a tapping operation that was done only once, twice, or three times within a prescribed (predetermined) period of time (set in advance) or when image data in which the finger is present is not sent from the image data extracting unit 72 within a prescribed (predetermined) period of time (set in advance). When the operation determining unit 73 determines that tapping operations with the finger with respect to all four circles were successfully (normally) recognized, the operation determining unit 73 stores in the storage unit 90 data concerning the contents of the operations performed by the finger and, at the same time, sends a signal informing the display control unit 71 that the tapping operations performed by the finger have been successfully (normally) recognized. Subsequently, the display control unit 71 adds an image, e.g., indicating a green lamp, to the original screen M signifying that the tapping operations performed by the finger have been successfully (normally) recognized and displays the original screen M on the display apparatus 20 (S6). It is noted that, at this point, together with the image indicating a green lamp or in place of the image indicating a green lamp, the display control unit 71 may add images to the original screen M indicating one or more characters or graphics signifying that tapping operations performed by the finger have been successfully (normally) recognized. Alternatively, the control unit 70 may cause a specific notification sound to be emitted from the speaker unit 60 together with, or in place of, displaying an image signifying that tapping operations performed by the finger have been successfully (normally) recognized.

After the process of step S6, the positional data generating unit 74 generates positional data (XY coordinates) of each finger (fingertip) operation in the imaging range of the imaging apparatus 30 based on the image data for which the operation determining unit 73 has determined (confirmed) that the operation at each circle was a prescribed operation (S7). In addition, the reference data generating unit 75 stores the four pieces of positional data generated in this manner in the storage unit 90 as reference data concerning the visual confirmation screen S currently being displayed (S8). Since the reference data specifies (identifies) the position and the size of the visual confirmation screen S, by using the reference data the control unit 70 can recognize (determine) the range (span) of existence of the visual confirmation screen S that is being viewed by the user within the imaging range of the imaging apparatus 30. After the process of step S8 is performed, the reference data setting process (program) is ended.

On the other hand, when the operation determining unit 73 determines that tapping operations performed by the finger with respect to all four circles were not successfully (normally) recognized in the process of step S5, the operation determining unit 73 sends a signal informing the display control unit 71 that tapping operations performed by the finger were not successfully (normally) recognized. Subsequently, the display control unit 71 adds an image, e.g., indicating a red lamp, to the original screen M signifying that tapping operations performed by the finger have not been successfully (normally) recognized and displays the original screen M on the display apparatus 20 (S9). Upon viewing the image indicating the red lamp, the user must once again perform a tapping operation using a finger on each circle on the visual confirmation screen S to set the reference data. It is noted that, at this point, together with the image indicating a red lamp or in place of the image indicating a red lamp, the display control unit 71 may add images to the original screen M indicating one or more characters or graphics signifying that tapping operations performed by the finger have not been successfully (normally) recognized. Alternatively, the control unit 70 may cause a specific notification sound to be emitted from the speaker unit 60 together with, or in place of, displaying an image signifying that tapping operations performed by the finger have not been successfully (normally) recognized.

After the process of step S9, the control unit 70 determines whether or not the process of current step S5 is a first time process (S10). When the process of current step S5 is a first time process (i.e. it is the first time that it has been performed after initiation of the reference data setting process), the process returns to step S2. Furthermore, when the process of current step S5 is not a first time process, the control unit 70 determines whether or not the process of current step S5 is a second time process (S11). When the process of current step S5 is a second time process (i.e. it is the second time that it has been performed after initiation of the reference data setting process), the process is again returned to step S2. On the other hand, when the process of current step S5 is not a first time process or a second time process (i.e. it is the third time that the process has been performed unsuccessfully), the reference data setting process is ended. In other words, when the red lamp is displayed on the visual confirmation screen S, the user is given two further opportunities to successfully perform the necessary (tapping) operations using a finger. When an operation using a finger is not successfully (normally) recognized even then, the current reference data setting process may be terminated and then a new reference data setting process may be executed (initiated) once again.

In the present embodiment the operation determining unit 73 determines whether or not an operation using a finger with respect to each circle is a tapping operation and determines whether or not tapping operations using a finger with respect to all four circles have been successfully (normally) recognized in step S5. However, the operation determining unit 73 may instead determine every time the finger performs an operation with respect to each circle whether or not the operation is a tapping operation and also may determine whether or not the tapping operation has been successfully (normally) recognized. In this case, every time the operation determining unit 73 determines that a tapping operation performed using a finger with respect to each circle has been successfully (normally) recognized, the display control unit 71 may preferably display on the original screen M an image signifying that the tapping operation performed by the finger with respect to the circle was successfully (normally) recognized; furthermore, every time the operation determining unit 73 determines that a tapping operation performed by a finger with respect to each circle has not been successfully (normally) recognized, the display control unit 71 may preferably display on the original screen M an image signifying that a tapping operation performed by a finger with respect to the circle has not been successfully (normally) recognized. Specifically, representative, non-limiting examples of an image signifying that a tapping operation performed by a finger with respect to each circle has been successfully (normally) recognized may include, e.g., an image that inversely displays the circle and an image displaying the color of the circle in green; furthermore, an example of an image signifying that a tapping operation performed by a finger with respect to each circle has not been successfully (normally) recognized may be an image displaying the color of the circle in red. In addition or in the alternative, the control unit 70 may cause a specific notification sound to be emitted from the speaker unit 60 together with, or in place of, an image signifying that a tapping operation performed by a finger with respect to each circle has been successfully (normally) recognized or an image signifying that a tapping operation performed by a finger with respect to the circle has not been successfully (normally) recognized.

Furthermore, in the present embodiment the user performs a prescribed operation using a finger with respect to four prescribed locations on the visual confirmation screen S to acquire four pieces of positional data. However, the user may instead perform a prescribed operation using a finger with respect to one, two, or three prescribed locations on the visual confirmation screen S to acquire positional data of the one, two, or three locations. But, in this case, data concerning the size of the visual confirmation screen S must be calculated in advance by computation from data of the original screen M corresponding to the visual confirmation screen S and stored in the storage unit 90. Furthermore, the respective pieces of positional data and data concerning the size of the visual confirmation screen S constitute the reference data.

Figure 10:
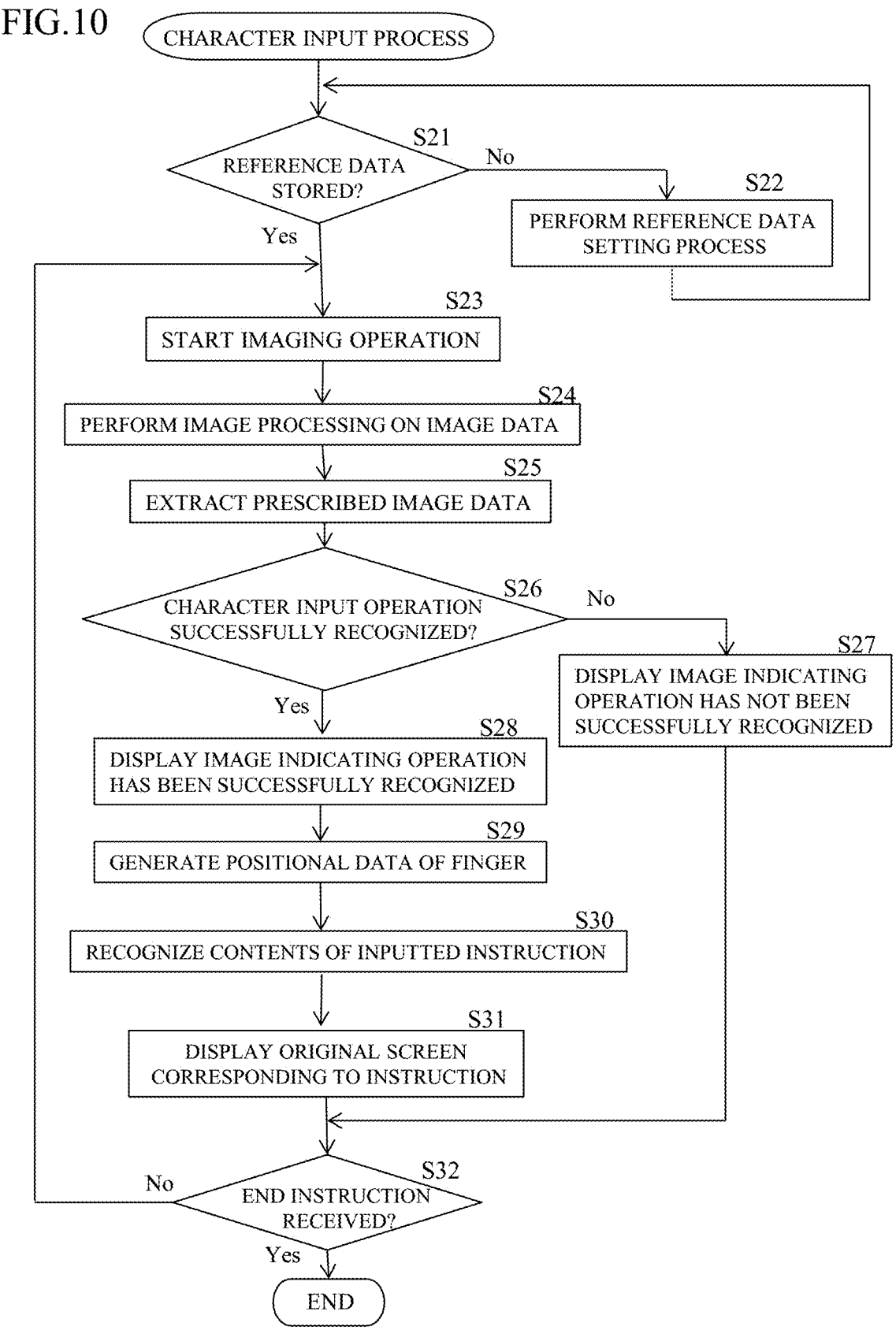
FIG. 10 is a flow chart that explains a character input procedure in the computer display device according to the first embodiment.

Next, a character input process in the computer display device 1 according to the first embodiment will be described using FIG. 10, which is a flow chart that explains a procedure of a representative, non-limiting process for inputting characters. In the following description, it is assumed that the character input screen 200 is displayed in advance on the display apparatus 20 as the original screen M.

To begin the process, the user first issues a voice instruction (command) to perform a character input via the microphone unit 50 or issues (inputs) a manual instruction to perform character input using the touchpad unit 40, or the like. Upon receiving the instruction, the control unit 70 reads the character input program for the character inputting process from the storage unit 90 and executes (initiates) the character inputting process in accordance with the processing flow shown in FIG. 10. It is noted that the character input process may be configured to be automatically executed (initiated) when the character input screen 200 is displayed on the display apparatus 20 as the original screen M.

Then, the control unit 70 determines whether or not reference data concerning the visual confirmation screen S corresponding to the original screen M currently being displayed on the display apparatus 20 is stored in the storage unit 90 (S21). When reference data concerning the visual confirmation screen S is not stored in the storage unit 90, the control unit 70 reads the reference data setting program from the storage unit 90 and executes the reference data setting process in accordance with the processing flow shown in FIG. 8 (S22). Subsequently, the process is returned to step S21. It is noted that, although the present embodiment executes the reference data setting process when reference data concerning the visual confirmation screen S is not stored in the storage unit 90, even if reference data concerning the visual confirmation screen S is stored in the storage unit 90, the reference data setting process may be executed to once again generate the reference data when an instruction is received from the user.

When it is determined in step S21 that reference data concerning the visual confirmation screen S is stored in the storage unit 90, the control unit 70 starts an imaging operation performed by, or together with, the imaging apparatus 30 (S23). The user performs a prescribed operation such as a tapping operation using a finger on the keyboard image 210 of the character input screen 200 that is the visual confirmation screen S. In this case, the user performs the prescribed operation in order to notify the control unit 70 of the position at which the user is performing the operation. One or more images of the operation by the user is (are) captured by the imaging apparatus 30 and the obtained image data is sent to the image processing unit 32. In addition, the image processing unit 32 performs prescribed image processing on the image data and the image data, which was subjected to the image processing, is sent to the control unit 70 (S24).

Next, the image data extracting unit 72 determines whether or not the subject (object) is a finger based on the image data obtained by imaging performed by the imaging apparatus 30 and, if so, extracts image data in which the finger is present (S25). In other words, the image data extracting unit 72 extracts image data of the finger that is at a position separated (spaced) from the imaging apparatus 30 by an approximately constant distance along the Z axis direction. Subsequently, the operation determining unit 73 determines whether or not the operation performed by the finger is a prescribed operation (in this case, a tapping operation) based on the image data extracted by the image data extracting unit 72. This determination is made within a prescribed (predetermined) period of time (set in advance). In addition, when the operation performed by the finger is a tapping operation, the operation determining unit 73 determines that a character input operation has been successfully (normally) recognized, and when the operation performed by the finger is not a tapping operation, the operation determining unit 73 determines that a character input operation has not been successfully (normally) recognized (S26). When it is determined that a character input operation has been successfully (normally) recognized, the operation determining unit 73 stores data concerning the contents of the operation performed by the finger in the storage unit 90 and, at the same time, sends a signal informing the display control unit 71 that a character input operation has been successfully (normally) recognized. When the display control unit 71 receives the signal, the display control unit 71 adds an image, e.g., indicating a green lamp, to the original screen M signifying that the operation for character input has been successfully (normally) recognized and displays the original screen M on the display apparatus 20 (S28). It is noted that, together with the image indicating a green lamp or in place of the image indicating a green lamp, the display control unit 71 may (also) add one or more images to the original screen M indicating one or more characters or graphics signifying that the character input operation has been successfully (normally) recognized. Alternatively, as was described above, the control unit 70 may cause a specific notification sound to be emitted from the speaker unit 60 together with, or in place of, displaying an image signifying that the character input operation has been successfully (normally) recognized.

On the other hand, when the operation determining unit 73 determines in step S26 that a character input operation has not been successfully (normally) recognized within a prescribed (predetermined) period of time (set in advance), the operation determining unit 73 sends a signal to that effect to the display control unit 71. At this point, for example, if image data in which a finger is present is not sent from the image data extracting unit 72 within the prescribed (predetermined) period of time (set in advance), the operation determining unit 73 determines that a character input operation has not been successfully (normally) recognized. When the display control unit 71 receives the signal, the display control unit 71 adds an image, e.g., indicating a red lamp, to the original screen M signifying that a character input operation has not been successfully (normally) recognized and displays the original screen M on the display apparatus 20 (S27). Subsequently, the process returns to step S32. It is noted that, at this point, together with the image indicating a red lamp or in place of the image indicating a red lamp, the display control unit 71 may (also) add one or more images indicating characters or graphics to the original screen M signifying that a character input operation has not been successfully (normally) recognized. Alternatively, as was described above, the control unit 70 may cause a specific notification sound to be emitted from the speaker unit 60 together with, or in place of, displaying an image signifying that character input the operation has not been successfully (normally) recognized.

After the process of step S28, the positional data generating unit 74 generates positional data of the finger (fingertip) in the imaging range of the imaging apparatus 30 based on image data for which the operation determining unit 73 has determined the operation performed by the finger is a tapping operation (S29). Positional data of a finger generated in this manner is stored in the storage unit 90.

Next, the input control unit 76 recognizes the contents of an inputted instruction corresponding to the operation performed by the finger based on: (i) the data concerning the contents of the operation performed by the finger as obtained by a determination by the operation determining unit 73, (ii) the positional data of the finger generated by the positional data generating unit 74, and (iii) the reference data concerning the visual confirmation screen S stored in the storage unit 90 (S30). For example, when the user performs a tapping operation using a finger with respect to a character key image in the keyboard image 210, by checking which character key image region in the keyboard image 210 to which the position of the finger obtained from positional data of the finger corresponds, the input control unit 76 can specify (identify) the character key on which the current tapping operation has been performed and recognize that input of the specified character key has been instructed (is intended by the user). Subsequently, the input control unit 76 sends a signal to the display control unit 71 concerning the recognized contents of the inputted instruction and the display control unit 71 displays the original screen M corresponding to the contents of the inputted instruction on the display apparatus 20 (S31).

After the process of step S31 or step S27, the control unit 70 determines whether or not an instruction to end (terminate) the character input procedure has been received from the user (S32). When an instruction to end character input procedure has been received, the character input process is ended. On the other hand, when an instruction to end character input procedure has not been received, the process returns to step S23 and the character input process is continued. It is noted that the user may issue the instruction (command) to end character input procedure by voice, by touching the touchpad unit 40, by virtually touching a predetermined location on the keyboard image 210, or the like.

Figure 11:
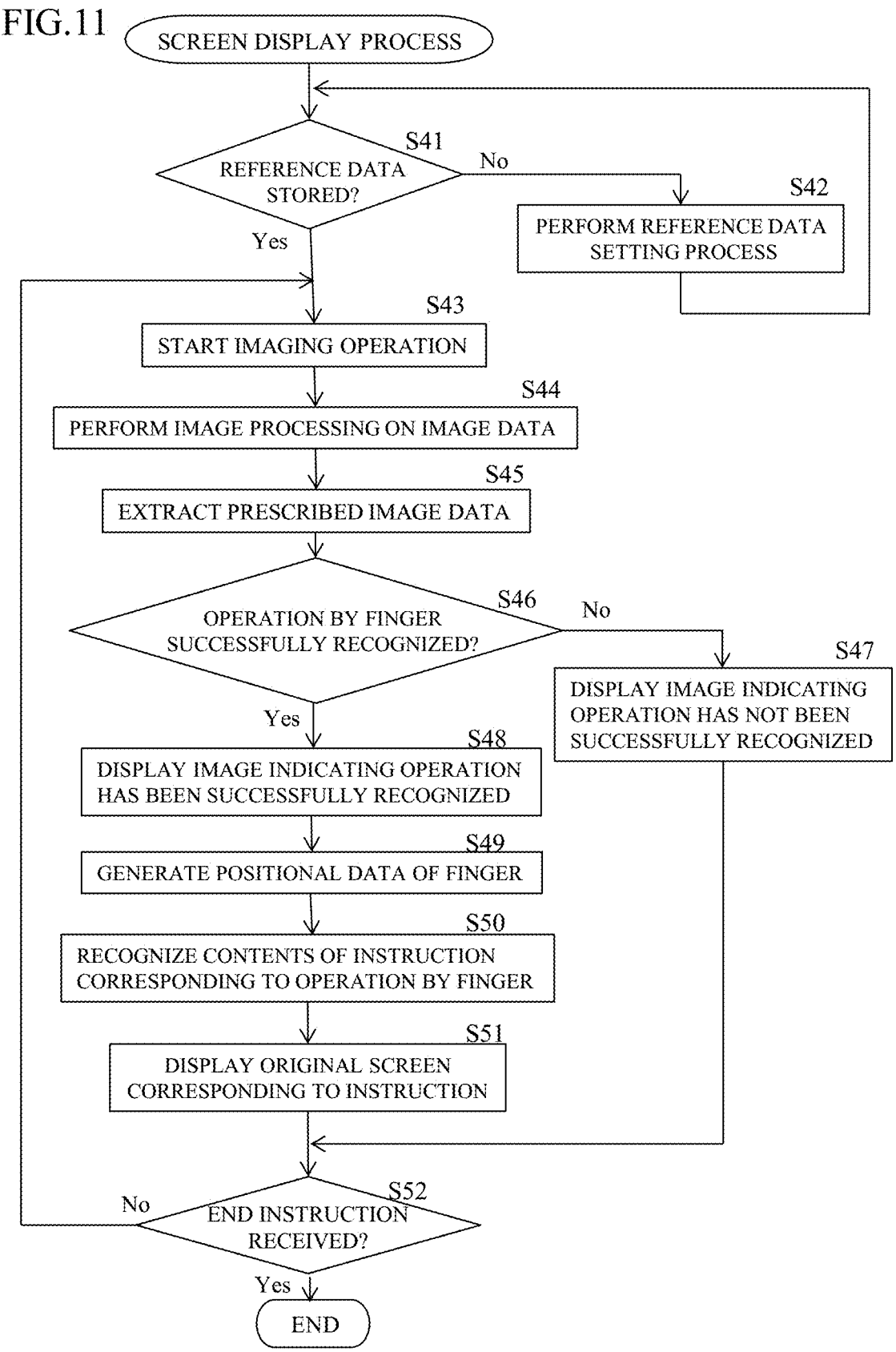
FIG. 11 is a flow chart that explains a screen display procedure in the computer display device according to the first embodiment.

Next, a screen display process in the computer display device 1 according to the first embodiment will be described with reference to FIG. 11, which is a flow chart that explains representative, non-limiting steps of the screen display process.

To begin the process, the user first issues a voice instruction (command) to perform an operation for screen display via the microphone unit 50 or issues (inputs) a manual instruction to perform an operation for screen display, e.g., using the touchpad unit 40, the visual confirmation screen S or the like. Upon receiving the instruction, the control unit 70 reads the screen display program from the storage unit 90 and executes (initiates) a screen displaying process in accordance with a processing flow shown in FIG. 11. It is noted that the screen displaying process (program) may be configured to be automatically executed when the original screen M is displayed on the display apparatus 20.

Then, the control unit 70 determines whether or not reference data concerning the visual confirmation screen S corresponding to the original screen M currently being displayed on the display apparatus 20 is stored in the storage unit 90 (S41). When reference data concerning the visual confirmation screen S is not stored in the storage unit 90, the control unit 70 reads the reference data setting program from the storage unit 90 and executes the reference data setting process in accordance with the processing flow shown in FIG. 8 (S42). Subsequently, the process returns to step S41. It is noted that, although the present embodiment executes the reference data setting process when reference data concerning the visual confirmation screen S is not stored in the storage unit 90, even if reference data concerning the visual confirmation screen S is stored in the storage unit 90, the reference data setting process may be executed to once again generate reference data when an instruction is received from the user.

When it is determined in step S41 that reference data concerning the visual confirmation screen S is stored in the storage unit 90, the control unit 70 starts an imaging operation performed by, or together with, the imaging apparatus 30 (S43). The user performs a desired operation using a finger on the visual confirmation screen S. One or more images of the operation performed by the user (the user's finger) is (are) captured by the imaging apparatus 30 and the obtained image data is sent to the image processing unit 32. In addition, the image processing unit 32 performs prescribed image processing on the image data and the image data, which has been subjected to the image processing, is sent to the control unit 70 (S44).

Next, the image data extracting unit 72 determines whether or not the subject (object) is a finger based on the image data obtained by the imaging performed by the imaging apparatus 30 and, if so, extracts image data in which the finger is present (S45). In other words, the image data extracting unit 72 extracts image data of the finger that is at a position separated (spaced) from the imaging apparatus 30 by an approximately constant distance along the Z axis direction. Subsequently, the operation determining unit 73 determines the contents of the operation performed by the finger based on the image data extracted by the image data extracting unit 72. In addition, the operation determining unit 73 determines whether or not the operation performed by the finger was successfully (normally) recognized (S46). When it is determined that an operation performed by the finger was successfully (normally) recognized, the operation determining unit 73 stores in the storage unit 90 data concerning the contents of the operation performed by the finger and, at the same time, sends a signal informing the display control unit 71 that the operation performed by the finger has been successfully (normally) recognized. When the display control unit 71 receives the signal, the display control unit 71 adds an image, e.g., indicating a green lamp, to the original screen M signifying that the operation performed by the finger has been successfully (normally) recognized and displays the original screen M on the display apparatus 20 (S48). It is noted that, together with the image indicating a green lamp or in place of the image indicating a green lamp, the display control unit 71 may (also) add images to the original screen M indicating one or more characters or graphics that signify the operation performed by the finger has been successfully (normally) recognized. Alternatively, as was described above, the control unit 70 may cause a specific notification sound to be emitted from the speaker unit 60 together with, or in place of, displaying an image signifying that the operation performed by the finger has been successfully (normally) recognized.

On the other hand, when the operation determining unit 73 determines in step S46 that an operation performed by the finger has not been successfully (normally) recognized, the operation determining unit 73 sends a signal to that effect to the display control unit 71. At this point, for example, if image data in which a finger is present is not sent from the image data extracting unit 72 within the prescribed (predetermined) period of time (set in advance), the operation determining unit 73 determines that a tapping operation has not been successfully (normally) recognized. When the display control unit 71 receives the signal, the display control unit 71 adds an image, e.g., indicating a red lamp, to the original screen M signifying that an operation performed by the finger has not been successfully (normally) recognized and displays the original screen M on the display apparatus 20 (S47). Subsequently, the process returns to step S52. It is noted that, at this point, together with the image indicating a red lamp or in place of the image indicating a red lamp, the display control unit 71 may (also) add images to the original screen M indicating one or more characters or graphics that signify the operation performed by the finger has not been successfully (normally) recognized. Alternatively, as was described above, the control unit 70 may cause a specific notification sound to be emitted from the speaker unit 60 together with, or in place of, displaying an image signifying that the operation performed by the finger has not been successfully (normally) recognized.

After the process of step S48, the positional data generating unit 74 generates positional data of the finger (fingertip) in the imaging range of the imaging apparatus 30 based on image data representing the contents of the operation performed by the finger as determined by the operation determining unit 73 (S49). Positional data of the finger generated in this manner is stored in the storage unit 90.

Next, the input control unit 76 recognizes the contents of an instruction corresponding to the operation performed by the finger based on: (i) the data concerning the contents of the operation performed by the finger as obtained by a determination by the operation determining unit 73, (ii) the positional data of the finger generated by the positional data generating unit 74, and (iii) the reference data concerning the visual confirmation screen S stored in the storage unit 90 (S50). For example, when the user performs a double-tapping operation on the visual confirmation screen S using a finger, the input control unit 76 specifies (identifies) that the current operation is a double-tapping operation and recognizes (determines) that an instruction to enlarge (or reduce) the original screen M has been received. Subsequently, the input control unit 76 sends a signal concerning the recognized contents of the instruction to the display control unit 71 and the display control unit 71 displays the original screen M in accordance with the contents of the instruction on the display apparatus 20 (S51), i.e. the size of the original screen M may be enlarged or reduced.

After the process of step S51 or step S47, the control unit 70 determines whether or not an instruction (command) to end (terminate) the screen display operation has been received from the user (S52). When an instruction to end the screen display operation has been received, the screen display process is ended (terminated). On the other hand, when an instruction to end the screen display operation has not been received, the process returns to step S43 and the screen display process is continued. It is noted that the user may issue (input) the instruction command to end the screen display operation by voice, by touch using the touchpad unit 40, or the virtual confirmation screen, or the like.

With the computer display device according to the first embodiment, when a user performs an operation on the visual confirmation screen using a finger, the input control unit recognizes (identifies or determines) the contents of the inputted instruction corresponding to the operation performed by the finger based on: (i) the data concerning the contents of the operation performed by the finger as obtained by a determination made by the operation determining unit, (ii) the positional data of the finger generated by the positional data generating unit, and (iii) the reference data concerning the visual confirmation screen and stored in the storage unit; the input control unit then controls (causes) the original screen to be displayed on the display apparatus in accordance with the recognized contents of the inputted instruction. Therefore, by performing, on a visual confirmation screen that appears as though it is floating in midair, an operation similar to a manual operation (manipulation) performed on a screen displayed on a conventional touch panel, the user can input an instruction (command) corresponding to the manual operation. Consequently, by using the computer display device according to the first embodiment, the user can easily and accurately input characters and perform various screen operations, including enlargement and reduction, by operating a visual confirmation screen in a manner similar to a conventional smartphone screen or a tablet screen.

Modification of the First Embodiment

Next, a computer display device according to a modification of the first embodiment of the present teachings will be described with reference to FIGS. 21A to 22B. Note that, in the present and all subsequent modifications and alternate embodiments, components sharing the same functions as those in the first embodiment described above will be denoted by the same reference numerals and detailed descriptions thereof will be omitted.

As shown in FIGS. 21A to 22B, the computer display device 1d according to the present modification includes many of the same components as were described above in the first embodiment.

The present computer display device 1d only differs from the computer display device 1 according to the first embodiment in the configuration of the display apparatus 20d. Specifically, the display apparatus 20d is comprised of a small projector 21 that includes a liquid crystal panel (display device) or the like, an optical system 22, and a half mirror 23. The half mirror 23 is embedded in the right-side lens section 11b of the eyeglass main body 10d as shown in FIGS. 21A to 22B. An original screen M displayed on the liquid crystal panel is projected on the half mirror 23 via the optical system as shown in FIGS. 21A to 22B.

Operational advantages of the computer display device 1d according to the present modification are similar to those of the first embodiment described earlier. Therefore, by using the presently-modified computer display device 1d, various screen operations such as character input and enlargement and reduction can be easily and accurately performed on a visual confirmation screen displayed in the field of vision.

Second Embodiment

Next, a computer display device according to a second embodiment of the present teachings will be described with reference to FIG. 12.

Figure 12:
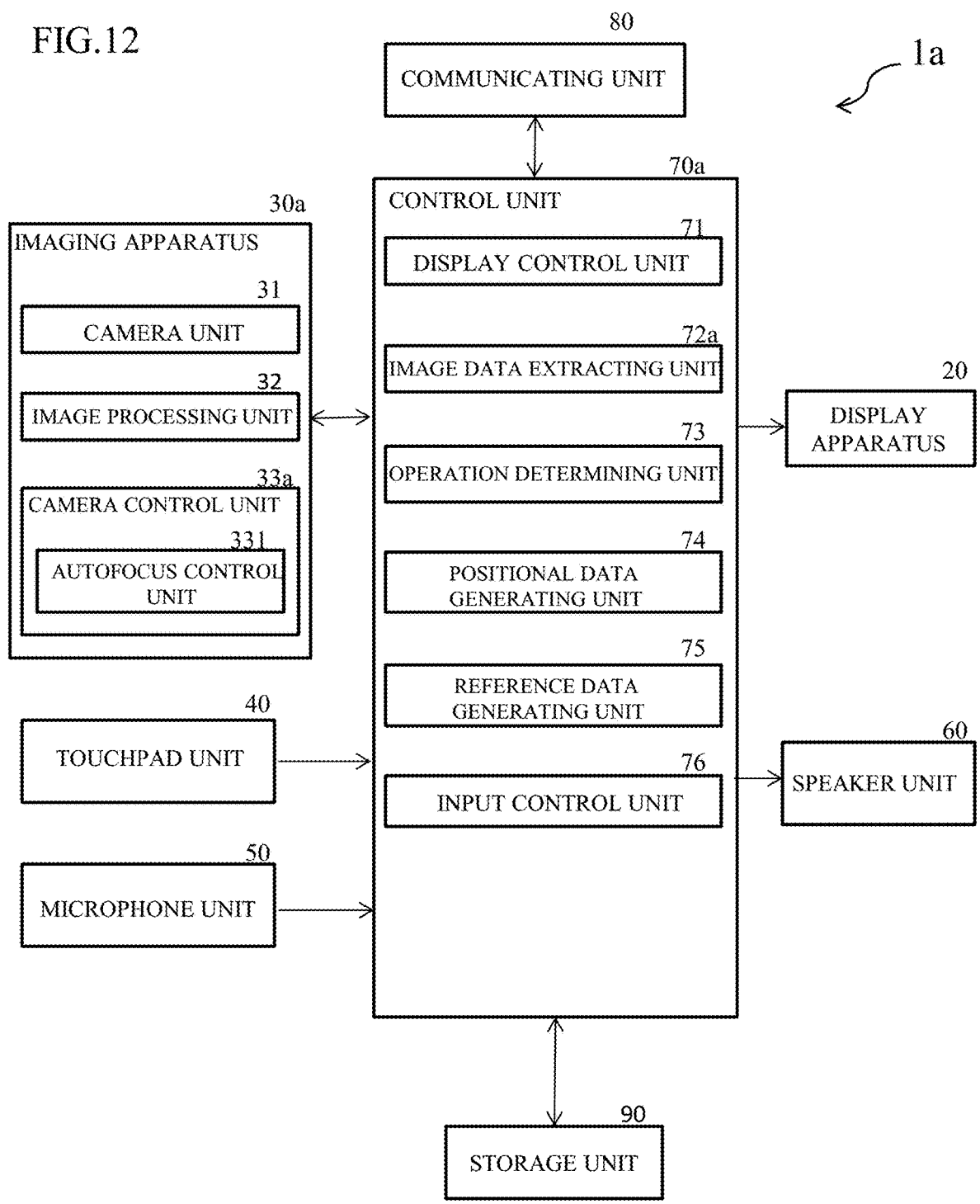
FIG. 12 is a schematic block diagram of a computer display device mounted on eyeglasses according to a second embodiment of the present teachings.

As shown in FIG. 12, the computer display device 1a according to the second embodiment includes the same components as were described above in the first embodiment.

The present computer display device 1a differs from the computer display device according to the first embodiment in that the camera control unit 33a includes an autofocus control unit 331 and that the image data extracting unit 72a extracts image data, in which the subject (object) is a finger and the finger is at a position separated (spaced) by an approximately constant distance from the imaging apparatus 30a in the Z axis direction, from image data sent from the imaging apparatus 30a.

The autofocus control unit 311 is configured or adapted to control the camera unit 31 so that a subject (object) at a prescribed position within the imaging range is automatically brought into focus. In the second embodiment, the imaging apparatus 30a has a large number of focal points so that any position within the imaging range can be automatically brought into focus. Therefore, when the user is performing an operation on the visual confirmation screen S using a finger, the imaging apparatus 30a is capable of automatically bringing the finger into focus and capturing images in a state in which the finger is in focus. In addition, when capturing an image of the subject (object) that has been automatically brought into focus, the autofocus control unit 331 calculates distance data to the captured subject (object). The calculated distance data is then associated with the image data. In addition, the image data obtained by the imaging operation performed by the imaging apparatus 30a and the distance data associated with the image data are sent to the control unit 70a. It is noted that, the autofocus system may be, e.g., either: (i) an active system, in which the subject is irradiated with infrared rays, ultrasonic waves, or the like and the distance is determined based on the period of time until reflected waves are detected or based on an irradiation angle, or (ii) a passive system, such as a phase difference detection system or a contrast detection system, that measures the distance using an image captured by the lens of the camera unit 31.

In addition, when the user performs an operation on the visual confirmation screen S using a finger and the imaging apparatus 30a captures an image of a subject (finger) in focus, the image data extracting unit 72a extracts image data containing the finger (as the subject/object) and the finger is at a position separated (spaced) by an approximately constant distance from the imaging apparatus 30a in the Z axis direction. This process is performed by (i) determining whether or not the subject is a finger based on image data obtained by the imaging and, at the same time, (ii) determining whether or not the subject (finger) is separated (spaced) by an approximately constant distance (set in advance) from the imaging apparatus 30a in the Z axis direction based on the distance data associated with the image data that was obtained by the above-described imaging operation. Known image (object) recognition methods and/or known image (object) recognition software may be used to determine whether or not the subject is a finger in a manner similar to the first embodiment. In addition, when determining whether or not the subject is separated (spaced) by an approximately constant distance from the imaging apparatus 30a in the Z axis direction, the approximately constant distance refers to the distance in the Z axis direction from the imaging apparatus 30a to the position of the visual confirmation screen S as recognized by the user. For example, when the user recognizes that the visual confirmation screen S is at a position separated (spaced) by approximately 40 cm from the imaging apparatus 30a, the above-mentioned approximately constant distance is set to a distance within a range of approximately 40 cm±5 cm from the imaging apparatus 30a. As described above, the image data extracting unit 72a can eliminate image data of the finger performing an operation at a position that is significantly in front of or behind the position where the visual confirmation screen S is being displayed and can thereby extract image data of the finger only when it is performing an appropriate operation on the visual confirmation screen S. It is noted that, the operation determining unit 73, the positional data generating unit 74, and the reference data generating unit 75 perform additional processes based on the image data extracted by the image data extracting unit 72a.

In a manner similar to the first embodiment, when the user performs an operation using a finger at one or a plurality of prescribed positions on the visual confirmation screen S, the reference data generating unit 75 generates data concerning the visual confirmation screen S as reference data using the positional data of the finger generated by the positional data generating unit 74 based on image data for which the operation determining unit 73 has determined an operation at each prescribed position is a prescribed operation. For example, when the user performs an operation using a finger with respect to the four corners of the outer frame of the visual confirmation screen S, the positional data of the finger at each position of the four corners can be used as reference data. As was described above, in the second embodiment as well, since image data extracted by the image data extracting unit 72a represents a captured image of a finger at a position separated (spaced) by an approximately constant position along the Z axis direction from the imaging apparatus 30a, it is considered/deemed that the positional data of the finger at each position of the four corners represents positional information of the finger on a plane parallel to an XY plane (approximately parallel to the user's body) at a position separated (spaced) from the imaging apparatus 30a by an approximately constant distance along the Z axis direction.

Next, a process for setting reference data in the computer display device 1a according to the second embodiment will be described using the flow chart according to the first embodiment shown in FIG. 8.

The reference data setting processes according to the first and second embodiments differ in the processes (steps S2 and S3) performed by the imaging apparatus 30a and the process (step S4) of extracting the image data that is performed by the image data extracting unit 72a. Therefore, only the different processes of the reference data setting process according to the second embodiment will be described with reference to the flow chart shown in FIG. 8.

After the process of step S1, the control unit 70a starts an imaging operation performed by, or together with, the imaging apparatus 30a (S2). Upon viewing the character input screen 201 shown in FIG. 9B as the visual confirmation screen S for setting the reference data, the user performs a prescribed operation such as a tapping operation using a finger on the respective numbered circles in an ascending numerical order on the visual confirmation screen S to set the reference data. One or more images of the operation by the user is (are) captured by the imaging apparatus 30a. At this point, the autofocus control unit 331 controls the camera unit 31 so that a subject (finger) within the imaging range is automatically brought into focus and the imaging apparatus 30a captures one or more images of the subject (finger) in focus. In addition, when capturing an image of the subject (finger) that has been automatically brought into focus, the autofocus control unit 331 calculates data concerning the distance to the captured subject and then associates the calculated distance data with the image data. The image data obtained by this imaging operation is sent to the image processing unit 32 and the image processing unit 32 performs prescribed image processing on the image data. Subsequently, the image data, which has been subjected to the image processing, and the distance data associated with the image data are sent to the control unit 70a (S3).

In step S4, the image data extracting unit 72a first determines whether or not the subject is a finger based on the image data obtained by imaging performed by the imaging apparatus 30a to extract image data in which the finger is present. Subsequently, by determining whether or not the subject is separated (spaced) by an approximately constant distance from the imaging apparatus 30a in the Z axis direction based on the distance data associated with the extracted image data in which the finger is present, the image data extracting unit 72a extracts image data whose subject is the finger and the finger is at a position separated (spaced) by an approximately constant distance from the imaging apparatus 30a in the Z axis direction. Note that each of the processes of the following steps (S5-S11) in the reference data setting process according to the second embodiment may be the same or similar to those of the first embodiment as shown in FIG. 8.

Next, a character input process in the computer display device 1a according to the second embodiment will be described with respect the flow chart according to the first embodiment shown in FIG. 10.

The character input processes according to the first and second embodiments differ in the processes (steps S23 and S24) performed by the imaging apparatus 30a and the process (step S25) of extracting the image data that is performed by the image data extracting unit. Therefore, only the different processes of the character input process according to the second embodiment will be described with reference to the flow chart shown in FIG. 10.

When it is determined in step S21 that reference data concerning the visual confirmation screen S is stored in the storage unit 90, the control unit 70a starts an imaging operation performed by, or together with, the imaging apparatus 30a (S23). The user performs a prescribed operation such as a tapping operation using a finger on the keyboard image 210 of the character input screen 200 that is the visual confirmation screen S. One or more images of the operation performed by the user (the user's finger) is (are) captured by the imaging apparatus 30a. At this point, the autofocus control unit 331 controls the camera unit 31 so that a subject (finger) within the imaging range is automatically brought into focus and the imaging apparatus 30a captures one or more images of the subject (finger) in focus. In addition, when capturing an image of the subject (finger) that has been automatically brought into focus, the autofocus control unit 331 calculates data concerning the distance to the captured subject and then associates the calculated distance data with the image data. The image data obtained by this imaging operation is then sent to the image processing unit 32 and the image processing unit 32 performs prescribed image processing on the image data. Subsequently, the image data, which has been subjected to the image processing, and the distance data associated with the image data are sent to the control unit 70a (S24).

In step S25, the image data extracting unit 72a first determines whether or not the subject is a finger based on the image data obtained by the imaging operation performed by the imaging apparatus 30a to extract image data in which the finger is present. Subsequently, by determining whether or not the subject is separated (spaced) by an approximately constant distance from the imaging apparatus 30a in the Z axis direction based on the distance data associated with the extracted image data in which the finger is present, the image data extracting unit 72a extracts image data whose subject (object) is the finger and the finger is at a position separated (spaced) by an approximately constant distance from the imaging apparatus 30a in the Z axis direction. Note that each of the following processes (S26-S32) in the character input process according to the second embodiment are the same or similar to those of the first embodiment as shown in FIG. 10.

Next, a screen display process in the computer display device 1a according to the second embodiment will be described with reference to the flow chart according to the first embodiment shown in FIG. 11.

The screen display processes according to the first and second embodiments differ in the processes (steps S43 and S44) performed by the imaging apparatus 30a and the process (step S45) of extracting the image data that is performed by the image data extracting unit. Therefore, only the different processes of the screen display process according to the second embodiment will be described with reference to the flow chart shown in FIG. 11.

When it is determined in step S41 that reference data concerning the visual confirmation screen S is stored in the storage unit 90, the control unit 70a starts an imaging operation performed by, or together with, the imaging apparatus 30a (S43). The user performs a desired operation using a finger on the visual confirmation screen S. One or more images of the operation by the user (the user's finger) is (are) captured by the imaging apparatus 30. At this point, the autofocus control unit 331 controls the camera unit 31 so that a subject (finger) within the imaging range is automatically brought into focus and the imaging apparatus 30a captures one or more images of the subject (finger) in focus. In addition, when capturing an image of the subject (finger) that has been automatically brought into focus, the autofocus control unit 331 calculates data concerning the distance to the captured subject and then associates the calculated distance data with the image data. The image data obtained by this imaging operation is then sent to the image processing unit 32 and the image processing unit 32 performs prescribed image processing on the image data. Subsequently, the image data, which has been subjected to the image processing, and the distance data associated with the image data are sent to the control unit 70a (S24).

In step S45, the image data extracting unit 72a first determines whether or not the subject is a finger based on the image data obtained by imaging performed by the imaging apparatus 30a to extract image data in which the finger is present. Subsequently, by determining whether or not the subject is separated (spaced) by an approximately constant distance from the imaging apparatus 30a in the Z axis direction based on the distance data associated with the extracted image data in which the finger is present, the image data extracting unit 72a extracts image data whose subject is the finger and the finger is at a position separated (spaced) by an approximately constant distance from the imaging apparatus 30a in the Z axis direction. Note that each of the following processes (S46-S52) in the screen display process according to the second embodiment may be the same or similar to those of the first embodiment as shown in FIG. 11.

Operational advantages of the computer display device according to the second embodiment are the same or similar to those of the computer display device according to the first embodiment. In particular, in the second embodiment, the imaging apparatus includes an autofocus control unit capable of automatically bringing a subject (e.g., a finger) into focus, and when an image of a subject (finger) that has been automatically brought into focus by the autofocus control unit is captured, distance data to the captured subject is calculated and the calculated distance data is output together with image data obtained by the imaging operation. Consequently, one or more images of a finger (fingertip), i.e. the subject/object, can be captured by bringing the subject/object more accurately into focus. Therefore, the control unit can more accurately generate the reference data, perform a character input process and the like, based on the image data obtained by the imaging operation and on the distance data.

It is noted that, in the computer display device according to the second embodiment, the display apparatus 20d according to the modification of the first embodiment may be used as the display apparatus. That is, as shown in FIGS. 21A to 22B, the display apparatus 20d may include a small projector 21, an optical system 22, and a half mirror 23 embedded in a right-side lens section 11b of the eyeglass main body 10d.

First Modification of the Second Embodiment

Next, a computer display device according to a first modification of the second embodiment of the present teachings will be described with reference to FIG. 13.

Figure 13:
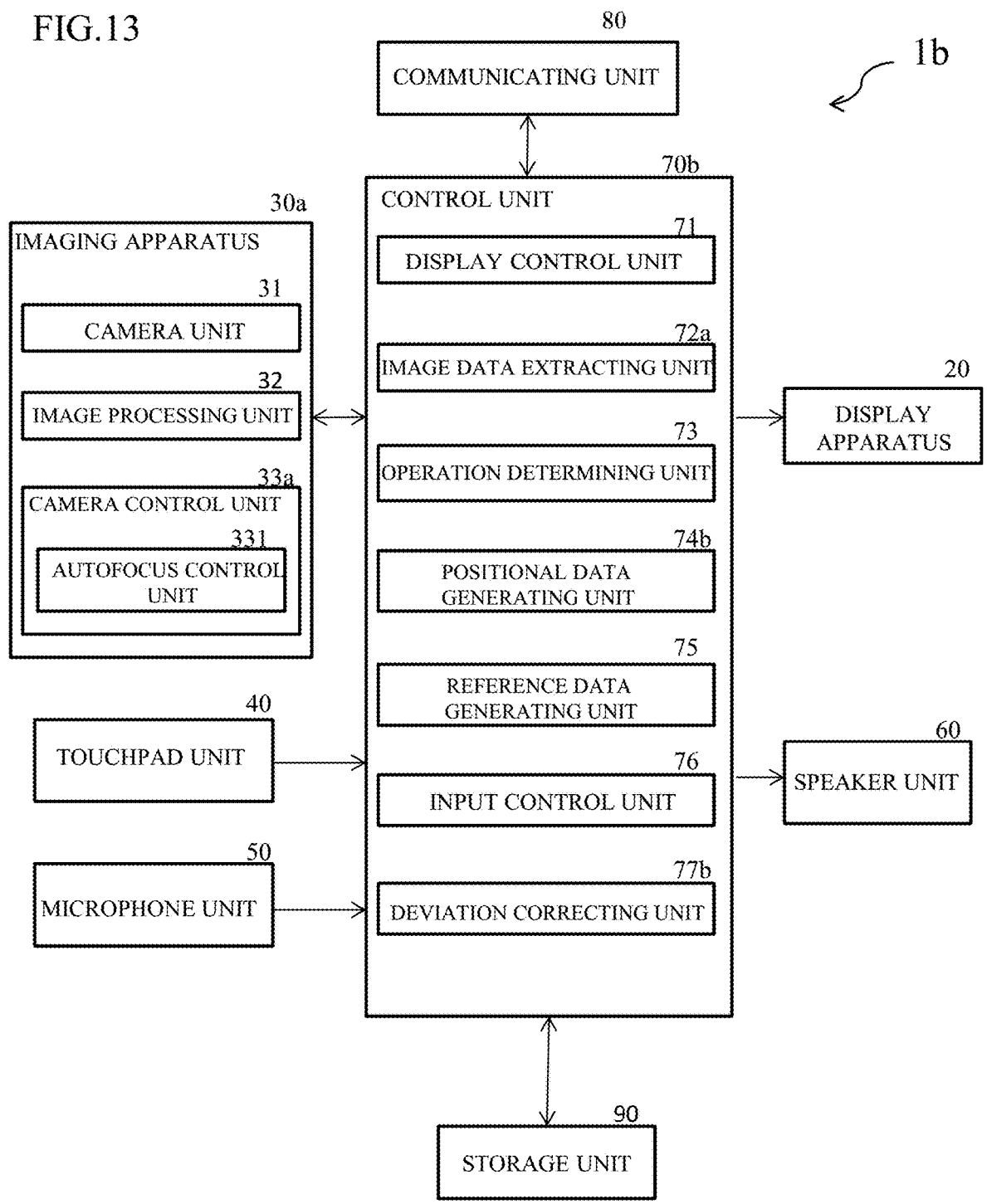
FIG. 13 is a schematic block diagram of a computer display device mounted on eyeglasses according to a first modification of the second embodiment of the present teachings.

As shown in FIG. 13, the computer display device 1b according to the first modification of the second embodiment includes the same components as FIG. 12. However, the control unit 70b of FIG. 13 further includes a deviation correcting unit 77b.

In the present modification, it is noted that the plane corresponding to the visual confirmation screen S, which is obtained based on the reference data concerning the visual confirmation screen S stored in the storage unit 90, will be referred to as "reference screen K".

For example, when inputting characters, the user may recognize that the screen to be actually operated, touched, virtually manipulated, etc. (hereinafter, also referred to as "operation screen T") is positioned in front of or behind reference screen K that is obtained based on the reference data; the user may then perform an operation on operation screen T using a finger. In other words, a deviation may occur between the operation screen T and reference screen K. When the deviation is large, there is a possibility that the control unit 70b may not be able to accurately determine to which position on reference screen K the position of a finger corresponds when the user performs an operation using the finger. The deviation correcting unit 77b executes a process (program) to convert positional data of the finger, which is obtained in accordance with the manual (actual) operation performed by the user on operation screen T using the finger, into positional data on reference screen K. In this case, the positional data of the finger obtained by an operation performed by the user on operation screen T using the finger is positional data that has been generated by the positional data generating unit 74b.

Figure 14:
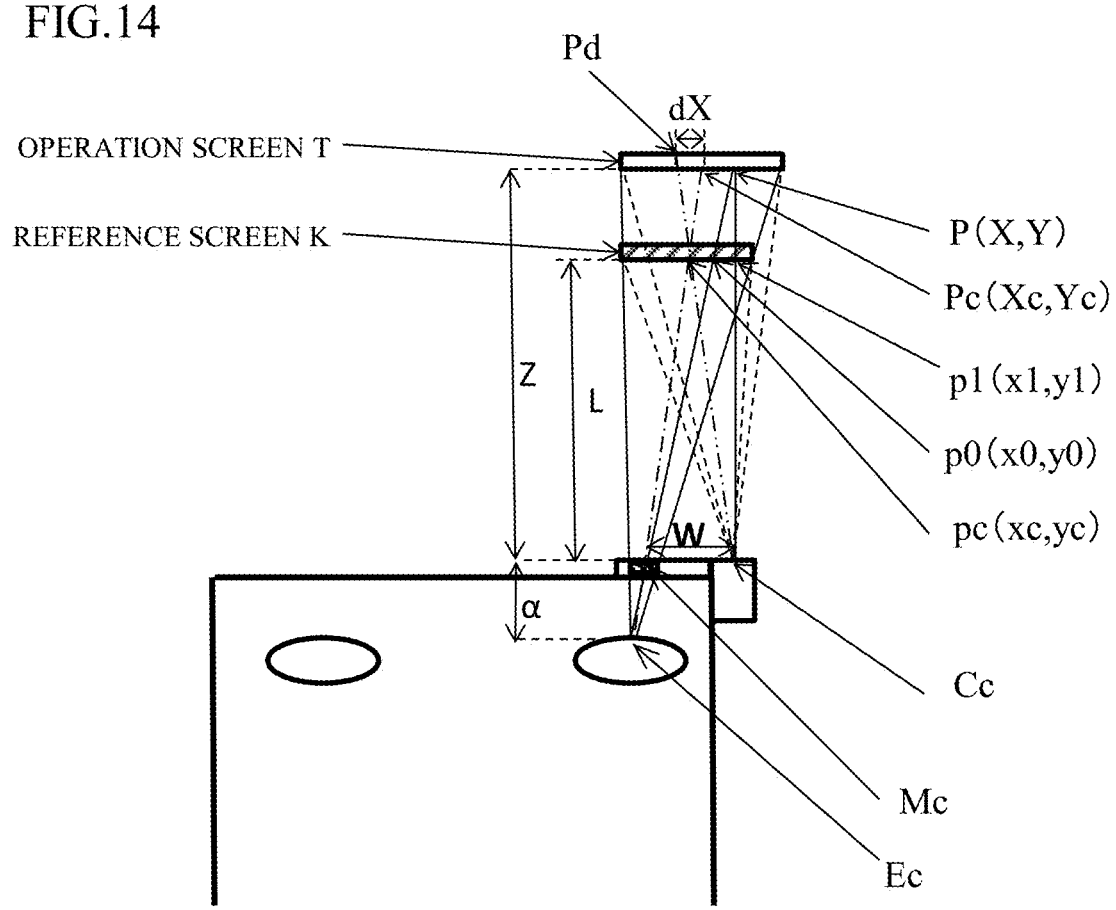
FIG. 14 is a diagram that explains a process performed by a deviation correcting unit to convert an X coordinate of positional data into an X coordinate of positional data on a reference screen K according to the first modification of the second embodiment.
Figure 15:
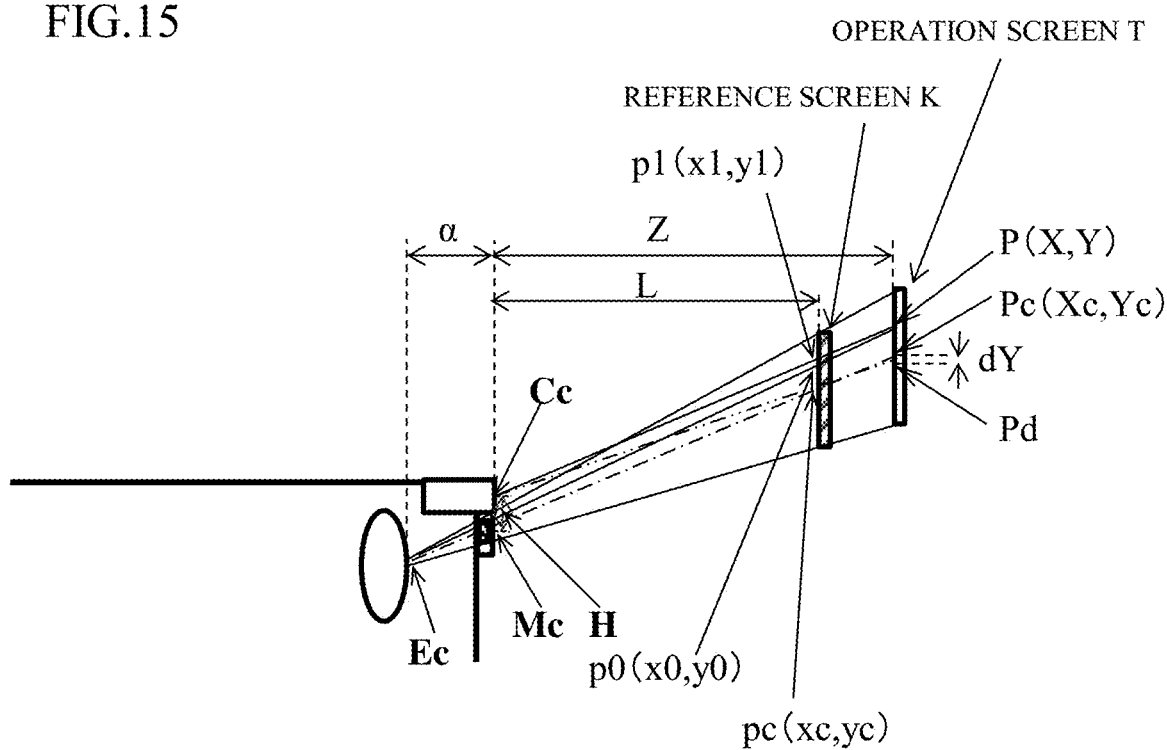
FIG. 15 is a diagram for explaining a process performed by a deviation correcting unit to convert a Y coordinate of positional data into a Y coordinate of positional data on the reference screen K according to the first modification of the second embodiment.

Next, a process for converting the positional data using the deviation correcting unit 77b will be described in further detail. The conversion process is individually (separately) performed for the X coordinate and the Y coordinate of the positional data. FIG. 14 shows a diagram that will be used to explain an exemplary process executed by the deviation correcting unit 77b to convert the X coordinate of the positional data (on operation screen T) into the X coordinate of the positional data on reference screen K according to the first modification of the second embodiment. FIG. 15 shows a diagram that will be used to explain an exemplary process executed by the deviation correcting unit 77b to convert the Y coordinate of the positional data (on operation screen T) into the Y coordinate of the positional data on reference screen K according to the first modification of the second embodiment. FIGS. 14 and 15 concern an embodiment in which the user recognizes that operation screen T is positioned behind reference screen K.

In FIGS. 14 and 15, point Cc represents the center position of the camera unit 31, point Mc represents the center position of the original screen M, and point Ec represents the center position of a pupil of the user. Point pc represents the center position of reference screen K and point Pc represents the center position of operation screen T. In this case, point Pc, point pc, point Mc, and point Ec exist on the same straight line. In addition, W denotes the distance between the center position of the camera unit 31 and the center position of original screen M in the X axis direction, H denotes the distance between the center position of the camera unit 31 and the center position of original screen M in the Y axis direction, L denotes the distance between original screen M and reference screen K in the Z axis direction, and a denotes the distance between the pupil of the user and original screen M in the Z axis direction. The values of W, H, and a are stored in advance in the storage unit 90; the value of L is obtained when generating the reference data (see above) and is stored in the storage unit 90.

Assuming that the user has performed an operation using a finger at point P on operation screen T, the point where a straight line connecting point P and point Mc intersects reference screen K is denoted by p0 and the point where a straight line connecting point P and point Cc intersects reference screen K is denoted by p1. In the present (modified) embodiment, the positional data generating unit 74b acquires the XY coordinates, when the actual position of the finger is projected onto reference screen K, as the positional data of the finger. Therefore, the positional data generating unit 74b calculates the positional data of point p1 as the positional data of point P. In addition, the distance between point P and original screen M in the Z axis direction or, in other words, the distance (Z) between operation screen T and original screen M in the Z axis direction is obtained from the distance data associated with the image data used when generating the positional data of point P. Since point p0 is the point on reference screen K that corresponds to point P on operation screen T, the deviation correcting unit 77b should obtain the positional data of point p0 from the positional data of point p1. It is noted that, hereinafter, the position coordinates of point P are denoted as (X, Y), the position coordinates of point p0 are denoted as (x0, y0), the position coordinates of point pc are denoted as (xc, yc), the position coordinates of point Pc are denoted as (Xc, Yc), and the position coordinates of point p1 are denoted as (x1, y1). Accordingly, since point pc is the center position of reference screen K, the position coordinates (xc, yc) thereof are known and are stored in the storage unit 90. Furthermore, the point where the straight line connecting point pc and point Cc intersects operation screen T is denoted as Pd, the distance between point Pd and point P in the X axis direction is denoted as dX, and the distance between point Pd and point P in the Y axis direction is denoted as dY.

An expression in which x0 is expressed using X can be obtained as follows. First, in FIG. 14, focusing on triangle pc-Pd-Pc and triangle pc-Cc-Mc, from dX:W=(Z−L):L, it is possible to obtain:

$$dX=W\times(Z-L)/L.$$

In addition, focusing on triangle Cc-Pd-P and triangle Cc-pc-p1, from {(X−Xc)+dX}:(x1−xc)=Z:L, it is possible to obtain:

$$X-Xc=(x1-xc)\times Z/L-dX=(x1-xc)\times Z/L-W\times(Z-L)/L.$$

Furthermore, focusing on triangle Ec-Pc-P and triangle Ec-pc-p0, from (X−Xc):(x0−xc)=(Z+α):(L+α), it is possible to obtain:

$$x0-xc=(X-Xc)\times(L+\alpha)/(Z+\alpha)=\{(x1-xc)\times Z/L-W\times(Z-L)/L\}\times(L+\alpha)/(Z+\alpha).$$

Therefore:

$$x0=(x0-xc)+xc=\{(x1-xc)\times Z/L-W\times(Z-L)/L\}\times(L+\alpha)/(Z+\alpha)+xc \quad (1)$$

Furthermore, by applying the same logic (mathematical derivations) to FIG. 15, an expression in which y0 is expressed using Y can be obtained as:

$$y0=(y0-yc)+yc=\{(y1-yc)\times Z/L-H\times(Z-L)/L\}\times(L+\alpha)/(Z+\alpha)+yc \quad (2)$$

Both expressions (1) and (2) are also true when the user recognizes that operation screen T is positioned in front of reference screen K.

By substituting the value of the positional data (x1, y1) of point p1, which is generated by the positional data generating unit 74b, and the value of the distance (Z) between point P and original screen M in the Z axis direction into the above-noted expressions (1) and (2), the deviation correcting unit 77b can obtain the positional data (x0, y0) of point p0.

When a user performs an operation using a finger, the input control unit 76 recognizes the contents of the inputted instruction corresponding to the operation performed by the finger based on: (i) the data concerning the contents of the operation performed by the finger as obtained by a determination made by the operation determining unit 73, (ii) the positional data (x0, y0) of the finger as obtained by the deviation correcting unit 77b, and (iii) the reference data concerning reference screen K (visual confirmation screen S) stored in the storage unit 90; the input control unit 76 then controls (selects) original screen M to be displayed on the display apparatus 20 in accordance with the recognized contents of the inputted instruction.

In the first modification of the second embodiment, even in case there is a deviation between operation screen T, as recognized by the user, and reference screen K due to the position of the user's finger being in front of or behind the position of reference screen K, a deviation correcting unit obtains (calculates) the position of the user's finger on reference screen K and an input control unit can accurately recognize the contents of the instruction made using the finger. It is noted that other advantages of the present modification are the same or similar to those of the second embodiment described above.

The positional data generating unit 74b is configured according to the first modification of the second embodiment so as to acquire the XY coordinates of a projection of a finger actually operated by the user on reference screen K as the positional data of the finger. However, it is also possible to configure the positional data generating unit 74 similar to the first and second embodiments so as to acquire the XY coordinates of a projection of a finger actually operated by the user on reference screen K as the positional data of the finger.

Second Modification of the Second Embodiment

Figure 23:
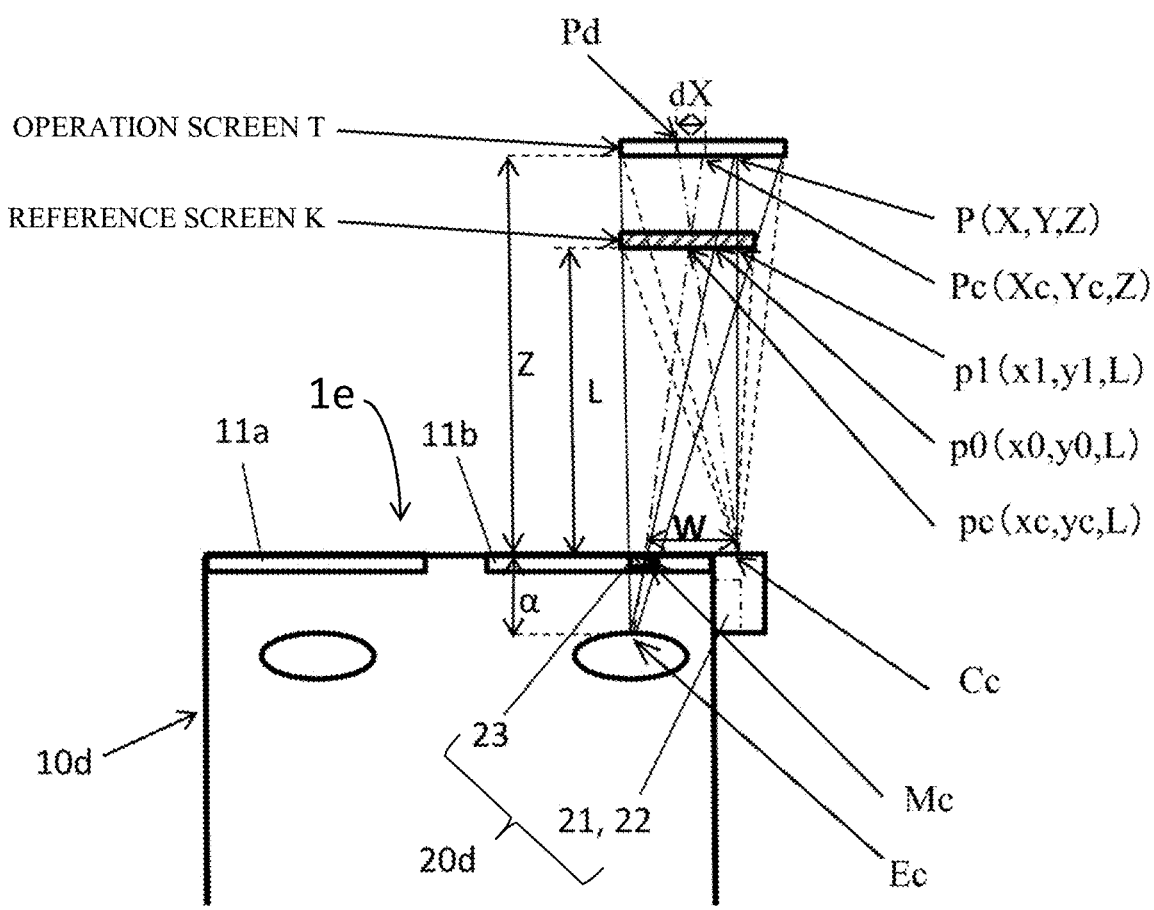
FIG. 23 is a schematic plan view of a computer display device mounted on eyeglasses according to a second modification of the second embodiment of the present teachings and is a diagram that explains a process performed by a deviation correcting unit to convert an X coordinate of positional data into an X coordinate of positional data on a reference screen K.
Figure 24:
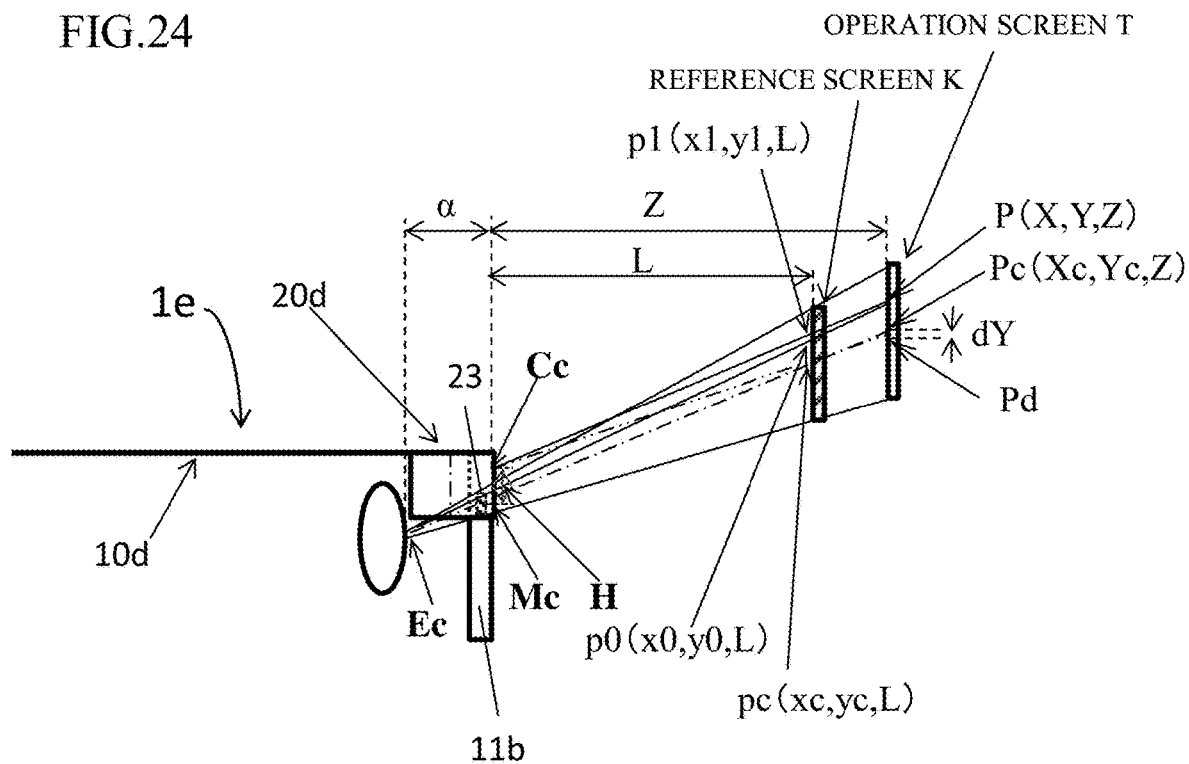
FIG. 24 is a schematic right side plan view of the computer display device according to the second modification of the second embodiment of the present teachings and is a diagram that explains a process performed by a deviation correcting unit to convert a Y coordinate of positional data into a Y coordinate of positional data on the reference screen K.

Next, a computer display device according to a second modification of the second embodiment of the present teachings will be described. FIG. 23 is a schematic plan view of the computer display device according to the second modification of the second embodiment of the present teachings and is a diagram that will be used to explain a process performed by a deviation correcting unit to convert an X coordinate of positional data (on operation screen T) into an X coordinate of positional data on reference screen K. FIG. 24 is a schematic right side view of the computer display device and is a diagram that will be used to explain a process performed by a deviation correcting unit to convert a Y coordinate of positional data (on operation screen T) into a Y coordinate of positional data on reference screen K. It will be understood that FIG. 23 generally corresponds to FIG. 14 and FIG. 24 generally corresponds to FIG. 15, such that only differences therebetween need be described.

The computer display device 1e according to the second modification of the second embodiment differs from the computer display device 1b according to the first modification of the second embodiment in that the display apparatus 20d according to the modification of the first embodiment is used as the display apparatus. In other words, as shown in FIGS. 23 and 24, the display apparatus 20d includes a small projector 21, an optical system 22, and a half mirror 23 embedded in a right-side lens section 11b of the eyeglass main body 10d.

In the computer display device 1e according to the present modification, the process for converting positional data using the deviation correcting unit 77b is performed in a manner similar to the above-described first modification of the second embodiment. Moreover, while the half mirror 23 is embedded in the lens section 11*b* in the present modification, the respective points (Cc, Mc, Ec, pc, Pc, and the like) and the respective distances (W, H, L, α, and the like) are defined exactly the same as in the first modification of the second embodiment as shown in FIGS. 23 and 24.

Operational advantages of the computer display device 1*e* according to the present modification are the same or similar to those of the above-described first modification of the second embodiment.

Third Embodiment

Next, a computer display device according to a third embodiment of the present teachings will be described with reference to FIG. 16.

Figure 16:
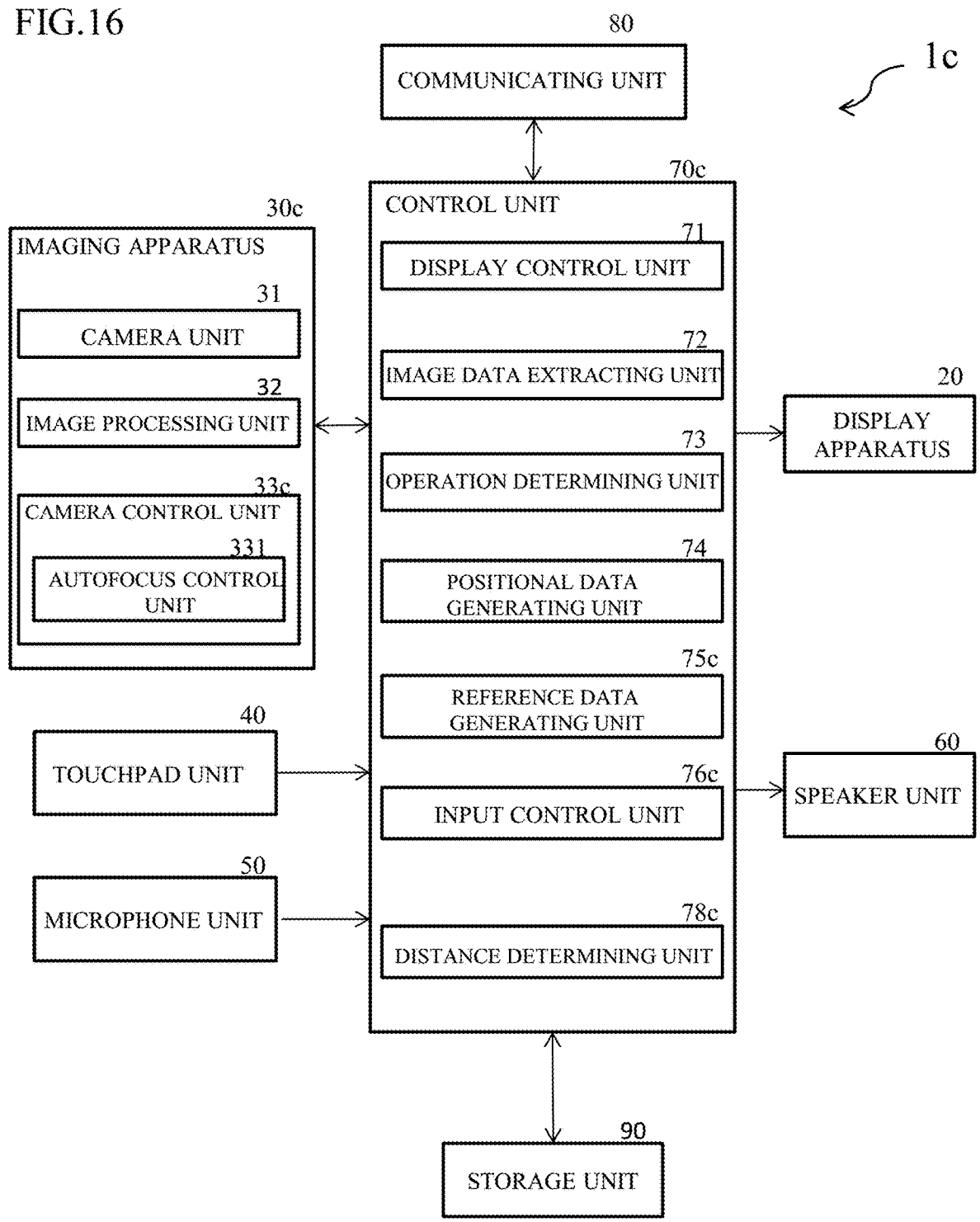
FIG. 16 is a schematic block diagram of a computer display device mounted on eyeglasses according to a third embodiment of the present teachings.

As shown in FIG. 16, the computer display device 1*c* according to the third embodiment basically includes the same components as the above-described first embodiment.

The computer display devices according to the first and third embodiments mainly differ in that the camera control unit 33*c* includes an autofocus control unit 331, the reference data generating unit 75*c* generates data that enables the position and the size in space to be specified as data (reference data) concerning a visual confirmation screen, and the control unit 70*c* includes a distance determining unit 78*c* that determines, when a user performs an operation on the visual confirmation screen S using a finger, whether or not the position of the finger is separated (spaced) by an approximately constant distance or less from the plane representing (containing) the visual confirmation screen S that is obtained using the reference data.

The autofocus control unit 311 may be the same as the autofocus control unit according to the second embodiment and may be configured to control the camera unit 31 so that a subject (object) at a prescribed position within the imaging range is automatically brought into focus. In the third embodiment, the imaging apparatus 30*c* has a large number of focal points so that any position within the imaging range can be automatically brought into focus. Therefore, when the user is performing an operation on the visual confirmation screen S using a finger, the imaging apparatus 30*c* is capable of automatically bringing the finger into focus and capturing one or more images in a state where the finger is in focus. In addition, when capturing an image of the subject (object) that has been automatically brought into focus, the autofocus control unit 331 calculates data concerning the distance to the captured subject (object). The calculated distance data is then associated with the image data. In addition, the image data obtained by the imaging operation performed by the imaging apparatus 30*c* and the distance data associated with the image data are sent to the control unit 70*c*. As was the case in the above-described embodiments, the autofocus system may be either (i) an active system, in which a subject is irradiated with infrared rays, ultrasonic waves, or the like and the distance is determined based on the period of time until reflected waves are detected or based on an irradiation angle or (i) a passive system, such as a phase difference detection system or a contrast detection system, that measures distance using an image captured by the lens of the camera unit 31.

When the user performs operations using a finger at three prescribed positions on the visual confirmation screen S, such as at three of the corners of the visual confirmation screen S, the reference data generating unit 75*c* generates data that enables the position and the size in a three-dimensional space to be specified as the data concerning the visual confirmation screen S by using the positional data of the finger at each position as generated by the positional data generating unit 74 based on: (i) the image data for which the operation determining unit 73 has determined that the operation at each prescribed position is a prescribed operation by and (ii) the distance data associated with the image data used when generating the positional data of the finger; the reference data generating unit 75*c* then stores the generated data as reference data in the storage unit 90. Specifically, for each position described above, coordinate information (three-dimensional data) in an XYZ coordinate system can be constructed based on the positional data of the finger (two-dimensional positional data) and the distance data (one-dimensional positional data), and the XYZ coordinate information (three-dimensional data) at the three positions described above can be used as the reference data. In addition, an equation of the plane representing (containing) the visual confirmation screen S in the XYZ coordinate system can also be calculated using the reference data. Generally, the plane representing (containing) the visual confirmation screen S, which is specified in this manner, need not necessarily be parallel to an XY plane. It is noted that, in the third embodiment, the plane corresponding (containing) to the visual confirmation screen S obtained based on the reference data concerning the visual confirmation screen S will be referred to as a "reference screen".

When the user performs an operation on the visual confirmation screen S using a finger and the imaging apparatus 30*c* captures one or more images of a subject (finger) in focus, the distance determining unit 78*c* determines whether or not the subject (finger) exists within an approximately constant distance (set in advance) from the plane (reference screen) corresponding to (containing) the visual confirmation screen S based on: (i) the positional data of the finger as generated by the positional data generating unit 74 based on the image data for which the operation determining unit 73 has determined the operation performed by the finger is a prescribed operation, (ii) the distance data associated with the image data used when generating the positional data of the finger, and (iii) the plane (reference screen) corresponding to (containing) the visual confirmation screen S which is obtained based on the (stored) reference data concerning the visual confirmation screen S. When determining whether or not the finger exists within an approximately constant distance from the reference screen, the approximately constant distance refers to a distance (or range of distances) at which it can be recognized or assumed (confirmed) that the user is intending to perform a valid operation (manipulation) on the visual confirmation screen S. In this case, the (range of the) approximately constant distance is set to, for example, approximately 5 cm. Accordingly, when determining that the finger is separated (spaced) from the reference screen by more than the approximately constant distance, the distance determining unit 78*c* recognizes or determines that the finger is performing an operation at a position that is significantly in front of or behind the position of the visual confirmation screen S. On the other hand, if it is determined that the finger is located within the approximately constant distance from the reference screen, the distance determining unit 78*c* recognizes or determines that the user is performing a valid operation (manipulation) on the visual confirmation screen S.

When the user performs an operation on the visual confirmation screen S using a finger and the distance determining unit 78*c* determines that the finger is located within the approximately constant distance from the reference screen, the input control unit 76*c* recognizes the contents of the inputted instruction corresponding to the operation performed by the finger based on: (i) the data concerning the contents of the operation performed by the finger as obtained by a determination made by the operation determining unit 73, (ii) the positional data of the finger generated by the positional data generating unit 74 based on the image data used to make the determination, (iii) the distance data associated with the image data used to make the determination, and (iv) the reference data concerning the visual confirmation screen S stored in the storage unit 90; the distance determining unit 78c then controls (selects, generates) the original screen M to be displayed on the display apparatus 20 in accordance with the recognized contents of the inputted instruction.

Next, a process for setting the reference data in the computer display device 1c according to the third embodiment will be described with reference to the flow chart according to the first embodiment shown in FIG. 8.

The reference data setting processes according to the first and third embodiments differ in the processes (steps S2 and S3) performed by the imaging apparatus 30c and the process (step S8) for generating the reference data that is performed by the reference data generating unit 75c. Therefore, only the different processes (steps) of the reference data setting process according to the third embodiment will be described with reference to the flow chart shown in FIG. 8.

Figure 17A:
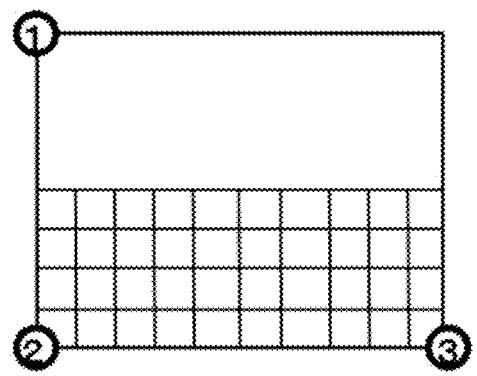
FIGS. 17A and 17B are diagrams showing an example of an original screen for setting reference data displayed during the reference data setting procedure according to the third embodiment.
Figure 17B:
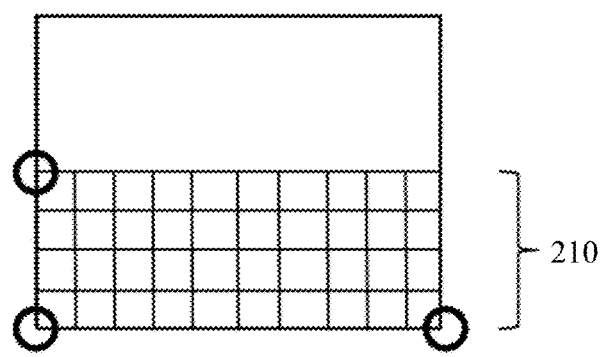

First, the display control unit 71 creates (generates) an original screen for setting (inputting) the reference data and displays the original screen on the display apparatus 20 (S1). FIGS. 17A and B show exemplary diagrams of the original screen M for setting the reference data that is displayed during the process of setting the reference data. In the example shown in FIG. 17A, the original screen M for setting the reference data is the character input screen 201 to which images representing circles and numerals have been added at three prescribed positions (i.e. at positions corresponding to three of the four corners). It is noted that, although images of a circle are displayed at the three prescribed corners of the character input screen 201 in FIG. 17A, images of a circle may instead be displayed at three prescribed corners (of the four total corners) of the keyboard image 210 on the character input screen 201 as shown in FIG. 17B. After the process of step S1, the control unit 70c starts an imaging operation performed by, or together with, the imaging apparatus 30c (S2). Upon viewing the character input screen 201 to which images of the circles and numerals have been added at the three prescribed positions as shown in FIG. 17A as the visual confirmation screen S for setting the reference data, the user performs a prescribed operation, such as a tapping operation using a finger, on the respective numbered circles in an ascending numerical order on the visual confirmation screen S for setting the reference data. One or more images of the operation performed by the user (the user's finger) is (are) captured by the imaging apparatus 30c. At this point, the autofocus control unit 331 controls the camera unit 31 so that a subject (object, i.e. the finger) within the imaging range is automatically brought into focus and the imaging apparatus 30c captures one or more images of the subject in focus. In addition, when capturing one or more images of the subject that has been automatically brought into focus, the autofocus control unit 331 calculates data concerning the distance to the captured subject and associates the calculated distance data with the image data. The image data obtained by this imaging operation is sent to the image processing unit 32 and the image processing unit 32 performs prescribed image processing on the image data. Subsequently, the image data, which has been subjected to the image processing, and the distance data associated with the image data are sent to the control unit 70c (S3).

In step S8, using the positional data of the finger at the three prescribed positions generated by the positional data generating unit 74 in step S7 and the distance data associated with the image data used when generating the positional data of the finger, the reference data generating unit 75c generates reference data concerning the visual confirmation screen S currently being displayed and stores the reference data in the storage unit 90.

Figure 18:
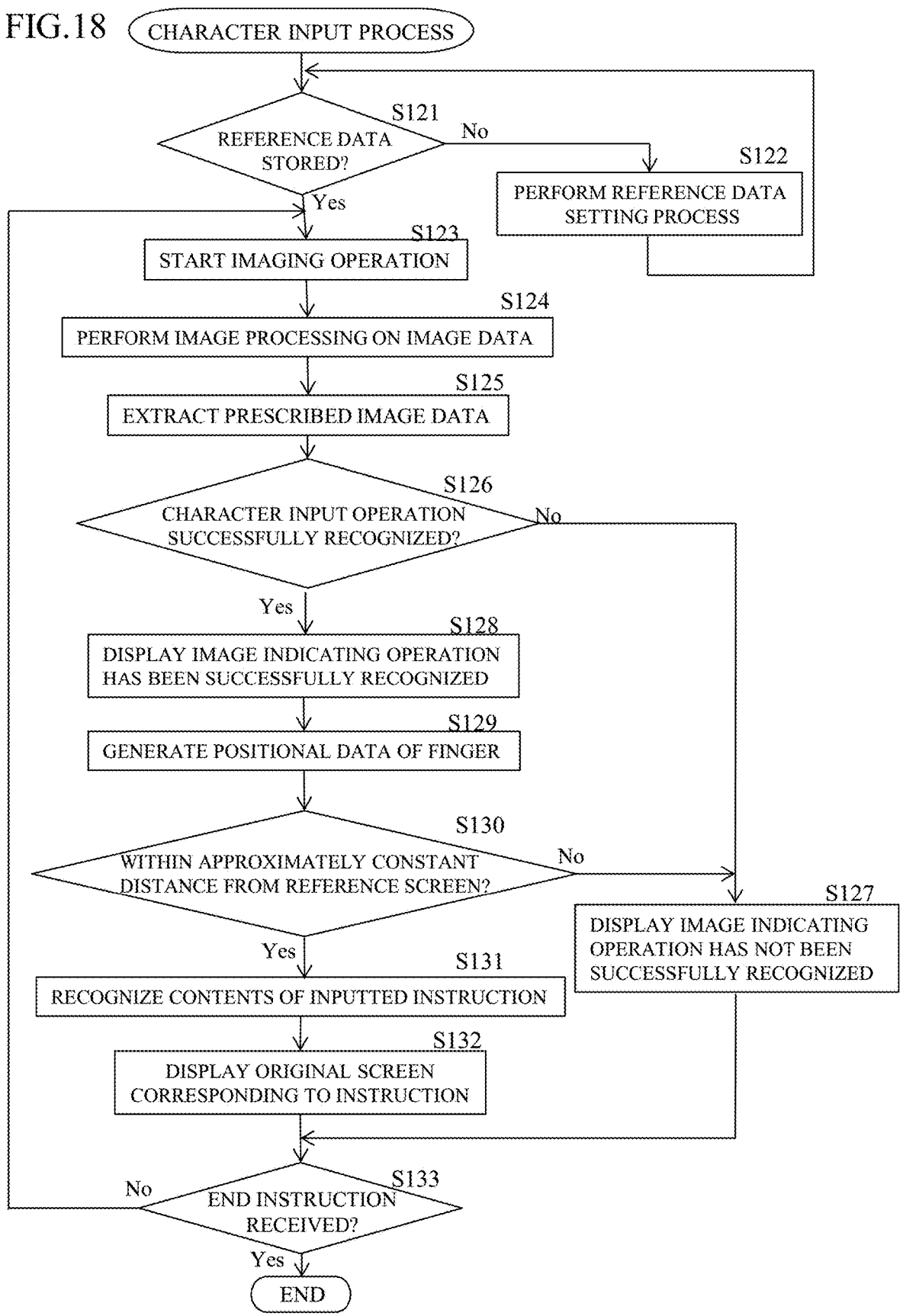
FIG. 18 is a flow chart that explains a character input procedure in the computer display device according to the third embodiment.

Next, a character input process in the computer display device 1c according to the third embodiment will be described with reference to FIG. 18, which is a flow chart that explains the character input procedure according to the third embodiment. In this embodiment, it is assumed that the character input screen 200 is displayed in advance on the display apparatus 20 as original screen M.

The user first issues a voice instruction (command) to input characters via the microphone unit 50 or issues (inputs) a manual instruction to perform character input using the touchpad unit 40 or the like. Upon receiving the instruction, the control unit 70c reads the character input program from the storage unit 90 and executes (initiates) the character inputting process in accordance with a processing flow shown in FIG. 18. It is noted that the character input process (program) may be configured or adapted to be automatically executed when the character input screen 200 is displayed on the display apparatus 20 as the original screen M.

Then, the control unit 70c determines whether or not reference data concerning the visual confirmation screen S that corresponds to original screen M, which is currently being displayed on the display apparatus 20, is stored in the storage unit 90 (S121). When reference data concerning the visual confirmation screen S is not stored in the storage unit 90, the control unit 70c reads the reference data setting program from the storage unit 90 and executes a reference data setting process (S122), as was described in the preceding embodiments. Subsequently, the process returns to step S121. It is noted that, although the present embodiment (like the above-described embodiments) executes the reference data setting process when reference data concerning the visual confirmation screen S is not stored in the storage unit 90, even if reference data concerning the visual confirmation screen S is stored in the storage unit 90, the reference data setting process may be executed when an instruction is received from the user to once again generate the reference data.

When it is determined in step S121 that reference data concerning the visual confirmation screen S is stored in the storage unit 90, the control unit 70c starts an imaging operation performed by, or together with, the imaging apparatus 30c (S123). Using a finger, the user performs a prescribed operation such as a tapping operation on the keyboard image 210 of the character input screen 200, which is the visual confirmation screen S. One or more images of the operation performed by the user (the user's finger) is (are) captured by the imaging apparatus 30c. At this point, the autofocus control unit 331 controls the camera unit 31 so that a subject (object, e.g., a finger) within the imaging range is automatically brought into focus and the imaging apparatus 30c captures one or more images of the subject in focus. In addition, when capturing the image(s) of the subject that has been automatically brought into focus, the autofocus control unit 331 calculates data concerning the distance to the captured subject and associates the calculated distance data with the image data. The image data obtained by this imaging operation is sent to the image processing unit 32 and the image processing unit 32 performs prescribed image processing on the image data. Subsequently, the image data, which has been subjected to the image processing, and the distance data associated with the image data are sent to the control unit 70c (S124).

Next, the image data extracting unit 72 determines whether or not the subject is a finger based on the image data obtained by imaging performed by the imaging apparatus 30c and, if so, extracts image data in which the finger is present (S125). Subsequently, the operation determining unit 73 determines whether or not the operation performed by the finger is a prescribed operation (in this case, a tapping operation) based on the image data extracted by the image data extracting unit 72. This determination is made within a prescribed (predetermined) period of time (set in advance). In addition, when the operation performed by the finger is a tapping operation, the operation determining unit 73 determines that a character input operation has been successfully (normally) recognized, and when the operation performed by the finger is not a tapping operation, the operation determining unit 73 determines that a character input operation has not been successfully (normally) recognized (S126). When it is determined that a character input operation has been successfully (normally) recognized, the operation determining unit 73 stores data concerning the contents of the operation performed by the finger in the storage unit 90 and, at the same time, sends a signal informing the display control unit 71 that a character input operation has been successfully (normally) recognized. When the display control unit 71 receives the signal, the display control unit 71 adds an image, e.g., indicating a green lamp, to the original screen M signifying that the character input operation has been successfully (normally) recognized and displays the original screen M on the display apparatus 20 (S128). It is noted that, together with the image indicating a green lamp or in place of the image indicating a green lamp, the display control unit 71 may add images to the original screen M indicating one or more characters or graphics signifying that the character input operation has been successfully (normally) recognized. Alternatively, as was described above, the control unit 70c may cause a specific notification sound to be emitted from the speaker unit 60 together with, or in place of, displaying an image signifying that the character input operation has been successfully (normally) recognized.

On the other hand, when the operation determining unit 73 determines in step S126 that a character input operation has not been successfully (normally) recognized within the prescribed (predetermined) period of time (set in advance), the operation determining unit 73 sends a signal to that effect to the display control unit 71. At this point, for example, if image data in which a finger is present is not sent from the image data extracting unit 72 within the prescribed (predetermined) period of time (set in advance), the operation determining unit 73 determines that a character input operation has not been successfully (normally) recognized. When the display control unit 71 receives the signal, the display control unit 71 adds an image, e.g., indicating a red lamp, to the original screen M signifying that a character input operation has not been successfully (normally) recognized and displays the original screen M on the display apparatus 20 (S127). Subsequently, the process returns to step S133. It is noted that, at this point, together with the image indicating a red lamp or in place of the image indicating a red lamp, the display control unit 71 may add images to the original screen M indicating one or more characters or graphics signifying that a character input operation has not been successfully (normally) recognized. Alternatively, as was described above, the control unit 70c may cause a specific notification sound to be emitted from the speaker unit 60 together with, or in place of, displaying an image signifying that the character input operation has not been successfully (normally) recognized.

After the process of step S128, the positional data generating unit 74 generates positional data of the finger (fingertip) in the imaging range of the imaging apparatus 30c based on image data for which the operation determining unit 73 has determined the operation performed by the finger is a tapping operation (S129). The positional data of the finger generated in this manner is stored in the storage unit 90.

Next, based on: (i) the positional data of the finger generated by the positional data generating unit 74, (ii) the distance data associated with the image data used when generating the positional data of the finger, and (iii) the reference data concerning the visual confirmation screen S stored in the storage unit 90, the distance determining unit 78c determines whether or not the finger is within an approximately constant distance set in advance from the plane (reference screen) corresponding to (containing) the visual confirmation screen S (S130). When the distance determining unit 78c determines that the finger is separated spaced from the reference screen by more than the (predetermined) approximately constant distance, the distance determining unit 78c determines that the user is not performing a valid operation on the visual confirmation screen S and subsequently returns to step S127. On the other hand, when the distance determining unit 78c determines in step S130 that the finger is located within the approximately constant distance from the reference screen, the distance determining unit 78c recognizes or determines that the user is performing a valid operation on the visual confirmation screen S and subsequently returns to step S131.

In step S131, based on: (i) the data concerning the contents of the operation performed by the finger determined and obtained by the operation determining unit 73, (ii) the positional data of the finger as generated by the positional data generating unit 74, (iii) the distance data associated with image data used to make the determination, and (iv) the reference data concerning the visual confirmation screen S stored in the storage unit 90, the input control unit 76c recognizes the contents of the inputted instruction corresponding to the operation performed by the finger. For example, when the user performs a tapping operation using a finger with respect to a character key image in the keyboard image 210, by checking which character key image region in the keyboard image 210 to which position of the finger obtained from the positional data of the finger corresponds, the input control unit 76c can specify (identify) the character key on which the current tapping operation has been performed and recognize (determine) that the input of the specified (identified) character key has been instructed (requested, intended by the user). Subsequently, the input control unit 76c sends a signal concerning the recognized contents of the inputted instruction to the display control unit 71 and the display control unit 71 displays original screen M, in accordance with the contents of the inputted instruction, on the display apparatus 20 (S132).

After the process of step S132 or step S127, the control unit 70c determines whether or not an instruction to end (terminate) the character input process has been received from the user (S133). When an instruction to end the character input process has been received, the character input process is ended (terminated). On the other hand, when an instruction to end the character input process has not been received, the process returns to step S123 and the character input process is continued. It is noted that the user may issue the instruction to end character input process by voice, by a touch operation on the touchpad unit 40, or the like, as was repeatedly described in the preceding embodiments.

Figure 19:
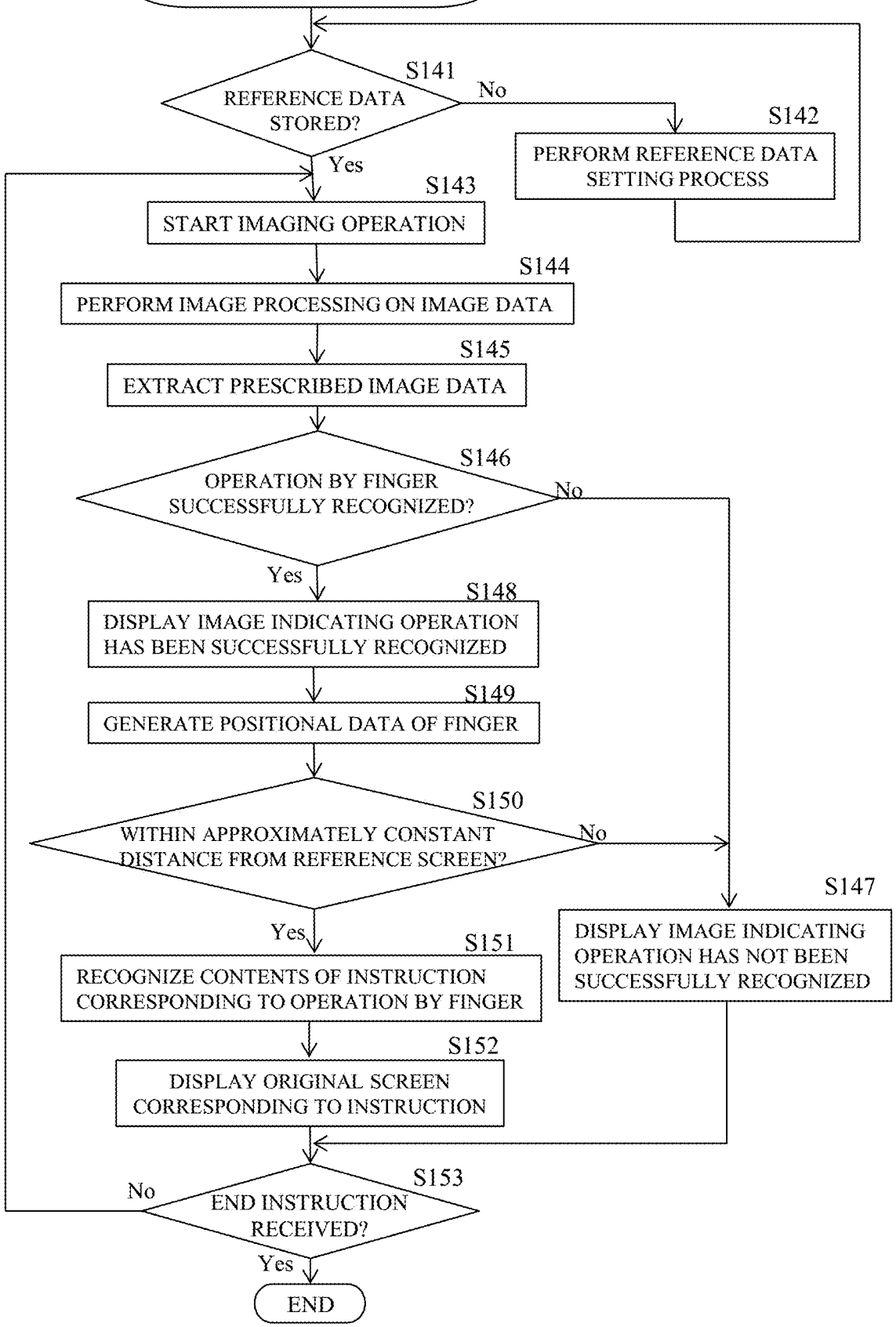
FIG. 19 is a flow chart that explains a screen display procedure in the computer display device according to the third embodiment.

Next, a screen display process according to the third embodiment will be described with reference to the flow chart of FIG. 19.

The user first issues (inputs) a voice instruction (command) to perform a screen display operation via the microphone unit 50 or issues (inputs) a manual instruction to perform the screen display operation using the touchpad unit 40, the visual confirmation screen S or the like. Upon receiving the instruction, the control unit 70c reads the screen display program from the storage unit 90 and executes (initiates) a screen displaying process in accordance with the processing flow shown in FIG. 19. It is noted that the screen displaying process may be configured to be automatically executed when original screen M is displayed on the display apparatus 20.

Then, the control unit 70c determines whether or not reference data concerning the visual confirmation screen S corresponding to the original screen M currently being displayed on the display apparatus 20 is stored in the storage unit 90 (S141). When reference data concerning the visual confirmation screen S is not stored in the storage unit 90, the control unit 70c reads the reference data setting program from the storage unit 90 and executed a reference data setting process (S142), in the same manner as was described in the preceding embodiments. Subsequently, the process returns to step S141. It is once again noted that, although the present embodiment executes the reference data setting process when reference data concerning the visual confirmation screen S is not stored in the storage unit 90, even if reference data concerning the visual confirmation screen S is stored in the storage unit 90, the reference data setting process may be executed when an instruction is received from the user to once again generate the reference data.

When it is determined in step S141 that reference data concerning the visual confirmation screen S is stored in the storage unit 90, the control unit 70c starts an imaging operation performed by, or together with, the imaging apparatus 30c (S143).

The user then uses a finger to perform a prescribed operation, such as a tapping operation, on the keyboard image 210 of the character input screen 200, which is the visual confirmation screen S. One or more images of the operation performed by the user (the user's finger) is (are) captured by the imaging apparatus 30c. At this point, the autofocus control unit 331 controls the camera unit 31 so that a subject (object, e.g., a finger) within the imaging range is automatically brought into focus and the imaging apparatus 30c captures one or more images of the subject in focus. In addition, when capturing the image(s) of the subject that has been automatically brought into focus, the autofocus control unit 331 calculates data concerning distance to the captured subject and associates the calculated distance data with the image data. The image data obtained by this imaging operation is sent to the image processing unit 32 and the image processing unit 32 performs prescribed image processing on the image data. Subsequently, the image data, which has been subjected to the image processing, and the distance data associated with the image data are sent to the control unit 70c (S144).

Next, the image data extracting unit 72 determines whether or not the subject is a finger based on the image data obtained by imaging performed by the imaging apparatus 30c and, if so, extracts image data in which the finger is present (S145). Subsequently, the operation determining unit 73 determines the contents of the operation performed by the finger based on the image data extracted by the image data extracting unit 72. In addition, the operation determining unit 73 determines whether or not the operation performed by the finger has been successfully (normally) recognized (S146). When it is determined that an operation performed by the finger has been successfully (normally) recognized, the operation determining unit 73 stores data concerning the contents of the operation performed by the finger in the storage unit 90 and, at the same time, sends a signal informing the display control unit 71 that the operation performed by the finger has been successfully (normally) recognized. When the display control unit 71 receives the signal, the display control unit 71 adds an image, e.g., indicating a green lamp, to original screen M signifying that the operation performed by the finger has been successfully (normally) recognized and displays the original screen M on the display apparatus 20 (S148). It is again noted that, together with the image indicating a green lamp or in place of the image indicating a green lamp, the display control unit 71 may add one or more images to original screen M indicating one or more characters or graphics signifying that the operation performed by the finger has been successfully (normally) recognized. Alternatively, as was described several times above, the control unit 70 may cause a specific notification sound to be emitted from the speaker unit 60 together with, or in place of, displaying an image signifying that the operation performed by the finger has been successfully (normally) recognized.

On the other hand, when the operation determining unit 73 determines in step S146 that an operation performed by the finger has not been successfully (normally) recognized, the operation determining unit 73 sends a signal to that effect to the display control unit 71. At this point, for example, if image data in which a finger is present is not sent from the image data extracting unit 72 within the prescribed (predetermined) period of time (set in advance), the operation determining unit 73 determines that a character input operation has not been successfully (normally) recognized. When the display control unit 71 receives the signal, the display control unit 71 adds an image indicating a red lamp to original screen M signifying that a character input operation performed by the finger has not been successfully (normally) recognized and displays original screen M on the display apparatus 20 (S147). Subsequently, the process returns to step S153. It is again noted that, at this point, together with the image indicating a red lamp or in place of the image indicating a red lamp, the display control unit 71 may add images to original screen M indicating one or more characters or graphics signifying that the operation performed by the finger has not been successfully (normally) recognized. Alternatively, as was described above, the control unit 70c may cause a specific notification sound to be emitted from the speaker unit 60 together with, or in place of, displaying an image signifying that the operation performed by the finger has not been successfully (normally) recognized.

After the process of step S148, the positional data generating unit 74 generates positional data of the finger (fingertip) in the imaging range of the imaging apparatus 30c based on the image data representing the contents of the operation performed by the finger as determined by the operation determining unit 73 (S149). The positional data of the finger generated in this manner is stored in the storage unit 90.

Next, based on: (i) the positional data of the finger generated by the positional data generating unit 74, (ii) the distance data associated with the image data used when generating the positional data of the finger, and (iii) the reference data concerning the visual confirmation screen S stored in the storage unit 90, the distance determining unit 78c determines whether or not the finger is within a predetermined, approximately-constant distance (set in advance) from the plane (reference screen) corresponding to (containing) the visual confirmation screen S (S150). When the distance determining unit 78c determines that the finger is separated (spaced) from the reference screen by more than the approximately constant distance, the distance determining unit 78c determines that the user is not performing a valid operation on the visual confirmation screen S and subsequently the process returns to step S147. On the other hand, when the distance determining unit 78c determines in step S150 that the finger is located within the approximately constant distance from the reference screen, the distance determining unit 78c recognizes or determines that the user is performing a valid operation on the visual confirmation screen S and subsequently the process returns to step S151.

In step S151, based on: (i) the data concerning to the contents of the operation performed by the finger determined and obtained by the operation determining unit 73, (ii) the positional data of the finger as generated by the positional data generating unit 74, (iii) the distance data associated with the image data used to make the determination, and (iv) the reference data concerning the visual confirmation screen S stored in the storage unit 90, the input control unit 76c recognizes the contents of the inputted instruction corresponding to the operation performed by the finger. For example, when the user uses a finger to perform a double-tapping operation on the visual confirmation screen S, the input control unit 76c specifies (identifies) that the current operation is a double-tapping operation and recognizes or determines that an instruction to enlarge (or reduce) original screen M has been received. Subsequently, the input control unit 76c sends a signal concerning the recognized contents of the inputted instruction to the display control unit 71 and the display control unit 71 displays original screen M, in accordance with the contents of the instruction, on the display apparatus 20 (S152).

After the process of step S152 or step S147, the control unit 70c may determine whether or not to terminate the screen display process (S153) in the same manner as was described in the preceding embodiments.

Operational advantages of the computer display device according to the third embodiment are similar to those of the computer display device according to the first embodiment. In particular, in the third embodiment, since the reference data generating unit generates data capable of specifying the position and the size of the visual confirmation screen S in space as reference data, even if the user is a person having a habit of, when operating the visual confirmation screen S using fingers involving, for example, operating at positions on a near side with respect to two left-side corners of the visual confirmation screen S and operating at positions on a far side with respect to two right-side corners of the visual confirmation screen S, reference data conforming to such a habit can be generated.

Moreover, in the computer display device according to the third embodiment, the display apparatus 20d according to the modification of the first embodiment may be used as the display apparatus. In this case, as shown in FIGS. 21A to 22B, the display apparatus 20d includes a small projector 21, an optical system 22, and a half mirror 23 embedded in a right-side lens section 11b of the eyeglass main body 10d.

Other Embodiments

The present teachings are not limited to the above-described embodiments and modifications; various changes can be made to the present teachings without departing from the spirit and scope of the invention.

For example, although the above-described embodiments and modifications thereof all involve a user performing operations on a visual confirmation screen using a finger, the user may instead or also perform operations on the visual confirmation screen for example, using an input instructing tool (writing utensil) such as a stylus or a pen.

In addition or in the alternative, in the above-described embodiments and modifications, when performing touch operations on the visual confirmation screen using a finger, the user may attach a prescribed mark to a fingertip, such as a simple graphic, symbol, or the like, e.g., a circle or a square. In such embodiments, the mark may be attached to a fingertip as, or in the form of, e.g., (i) an adhesive sticker inscribed with (depicting) the mark, (ii) a thimble or other covering having the mark that is worn on the fingertip or (iii) a ring inscribed with the mark worn around the fingertip, in addition to drawing the mark directly on the fingertip. Moreover, if touch operations are performed with a finger on the front side of the visual confirmation screen as shown in FIGS. 6A and 7A, the mark may be attached to the nail side of the finger. On the other hand, if touch operations are performed with a finger on the rear side of the visual confirmation screen (in addition or in alternative to the front side) as shown in FIGS. 6B and 7B, the mark may be attached to both the nail side of the finger and the fingertip or the pad (fingerprint) side of the finger. It is noted that, if touch operations are performed with a finger only on the rear side of the visual confirmation screen, the mark may be attached only to the fingertip or to the pad side of the finger. In any of these embodiments, the image data extracting unit extracts image data in which the mark is present as the image data in which the finger is present. In addition, the operation determining unit determines the contents of the operation performed by a finger based on movement of the mark and the positional data generating unit generates positional data of the mark as the positional data of the finger. In actual analysis and processing of image data, since a mark (such as a simple graphic or symbol) can be more easily and accurately recognized than a finger, the image (object) recognition precision can be increased.

In addition or in the alternative, although the above-described first, second, and third embodiments as well as the first modification of the second embodiment utilize a display apparatus that is provided separate from a lens of the eyeglass, the present teachings are not limited thereto and the display apparatus may be integrally configured with a lens.

In addition or in the alternative, although the above-described first, second, and third embodiments and the first modification of the second embodiment utilize a display apparatus that includes a small projector having a display device, an optical system, and a half mirror, wherein the half mirror is embedded in a prism arranged (disposed) in front of a lens section of an eyeglass main body, the half mirror may be integrated with the prism or may be affixed to the prism. In addition or in the alternative, although the above-described modification of the first embodiment and in the second modification of the second embodiment utilize a display apparatus that includes a small projector having a display device, an optical system, and a half mirror, wherein the half mirror is embedded in a lens section of an eyeglass main body, the half mirror may be affixed to the lens section or may be integrated with the lens section.

In addition or in the alternative, although the above-described embodiments and modifications utilize a display apparatus that includes a small projector having a display device, an optical system, and a half mirror, a holographic sheet or a holographic film that reflects a part of light (video) may be used in place of the half mirror. In such embodiments, the holographic sheet or the holographic film is affixed to a part of or all of a lens section of an eyeglass main body, is embedded in the lens section of the eyeglass main body, or is integrated with the lens section of the eyeglass main body. Accordingly, an image or a video from the small projector is projected onto the holographic sheet or the holographic film via the optical system and the user can view the image or the video reflected by the holographic sheet or the holographic film.

In addition or in the alternative, although the above-described embodiments and modifications utilize one original screen that is displayed on a display apparatus, the present teachings are not limited thereto and two original screens may be displayed on the display apparatus. In such embodiments, the user can view two visual confirmation screens that appear as though they are floating in midair. For example, if the keyboard image on the character input screen is divided into two such that the keyboard image is constituted by a right-side keyboard image and a left-side keyboard image, the user can recognize the right-side keyboard image and the left-side keyboard image as though they are floating in midair and can input characters using fingers of both hands.

In addition or in the alternative, in any of the above-described embodiments and modifications, two display apparatuses may be provided and a different original screen may be displayed in (by) each display apparatus. For example, by arranging one of the display apparatuses in front of the lens section for the right eye and the other display apparatus in front of the lens section for the left eye, the user can recognize (view) one of the visual confirmation screens with the right eye and recognize (view) the other visual confirmation screen with the left eye. In this case, two imaging apparatuses may be provided so that each imaging apparatus captures an image of a finger performing an operation on each visual confirmation screen.

In addition or in the alternative, although the above-described embodiments and modifications utilize an XY coordinate system that is set within the imaging range of the imaging apparatus and the origin of the XY coordinate system is a bottom left point in the imaging range, the origin of the XY coordinate system may be set to any position in the imaging range. For example, the origin of the XY coordinate system may be a top left point in the imaging range.

In addition or in the alternative, in the above-described second embodiment, when the image data extracting unit determines whether or not a subject is separated from the imaging apparatus in the Z axis direction by an approximately constant distance, the approximately constant distance is set to a distance within a range of approximately 40 cm±5 cm from the imaging apparatus. However, the present teachings are not limited thereto and the approximately constant distance may be set to, for example, 30 cm±3 cm or 50 cm±6 cm or any values therebetween. Alternatively, a configuration may be adopted which enables the user to freely change (set) the approximately constant distance. In a similar manner, in the third embodiment, when the distance determining unit determines whether or not a finger is located within an approximately constant distance from the reference screen, the approximately constant distance is set to approximately 5 cm. However, the present teachings are not limited thereto and the approximately constant distance may be set to, for example, 3 cm or 6 mm or any values therebetween. Alternatively, a configuration may be adopted which enables the user to freely change (set) the approximately constant distance.

In addition or in the alternative, in the third embodiment, when a user performs operations using a finger at three prescribed positions on a visual confirmation screen such as three of the corners of the visual confirmation screen, the reference data generating unit obtains XYZ coordinate information at the three positions using the positional data of the finger at each position and distance data associated with image data used when generating the positional data of the finger, and the reference data generating unit utilizes the obtained XYZ coordinate information at the three positions as the reference data. However, the present teachings are not limited thereto. For example, when the user performs operations using a finger at at least three prescribed positions on the visual confirmation screen, the reference data generating unit may obtain XYZ coordinate information at the at least three positions using the positional data of the finger at each position and the distance data sent together with image data used when generating the positional data of the finger, and may create (generate) the reference data based on the obtained XYZ coordinate information at each position. For example, when the user performs operations using a finger at the four corners of the visual confirmation screen, the reference data generating unit may obtain XYZ coordinate information at the four positions using the positional data of the finger at each position and the distance data associated with the image data used when generating the positional data of the finger, and may generate reference data based on the obtained XYZ coordinate information at the four positions. It is noted that, in such embodiments, if the four positions are not on the same plane when obtaining the XYZ coordinate information at the four positions, the reference data generating unit preferably obtains (determines) a plane with the smallest deviation from the four positions using a prescribed algorithm and generates reference data based on the obtained plane.

In addition or in the alternative, in the third embodiment, when a user performs operations using a finger at three prescribed positions on the visual confirmation screen, the reference data generating unit constructs coordinate information (three-dimensional data) in an XYZ coordinate system based on the positional data of the finger (two-dimensional positional data) and the distance data (one-dimensional positional data) at each position of the finger, and uses the three-dimensional data at the three positions as the reference data. However, for example, if two camera units are provided and three-dimensional positional data of a subject (object) can be obtained based on the image data (stereoscopic image data) obtained by capturing an image of the subject with each camera unit, the reference data generating unit may use three-dimensional positional data of each position of the finger that is obtained when the user performs an operation using the finger at three prescribed positions on the visual confirmation screen as the reference data.

In addition or in the alternative, although the above-described second and third embodiments utilize an autofocus control unit that controls an imaging apparatus so that a subject (object) is automatically brought into focus, the autofocus control unit may control the imaging apparatus so that only a subject (object) located within a constant distance from the imaging apparatus in the Z axis distance is automatically brought into focus. For example, only a subject (object) within one meter from the imaging apparatus may be brought into focus and a subject (object) separated (spaced) from the imaging apparatus by more than one meter is not brought into focus. Accordingly, the process for controlling the imaging apparatus so as to bring a subject (object) into focus and the process for extracting image data in which the finger is present from the image data captured by the imaging apparatus can be facilitated.

In addition or in the alternative, in the above-described embodiments, the in-focus range is limited to a narrow range during image capture by the imaging apparatus when performing operations for reference data setting, character input, and screen display. However, the present teachings are not limited thereto and, for example, the in-focus range may be limited to a constant range when performing normal camera photography using the imaging apparatus (digital camera) of the computer display device according to the present teachings. For example, when performing normal camera photography, a subject (object) that is separated (spaced) from the imaging apparatus by more than one meter is not brought into focus. In addition, when the in-focus range is limited to a constant range such as when performing an operation for setting the reference data as described above or when performing normal camera photography, notifying means for notifying a third party that the in-focus range is being limited is preferably provided. As the notifying means, for example, notification may be performed by turning on a light such as an LED provided on the eyeglass main body or by displaying a sign to that effect on the eyeglass main body, in both cases so that third parties (i.e. people around the person wearing the present computer display device). In this regard, it is noted that known computer display devices mounted on eyeglasses s create the risk of infringing on the privacy of people nearby when photographing using the imaging apparatus, which has created controversy concerning the use of such devices. However, with the present teachings, by not bringing into focus a subject that is separated (spaced) from the imaging apparatus by, for example, more than one meter and by providing notifying means for notifying third parties (nearby people) that the in-focus range is being limited to a (short) constant range, the issue of privacy (which has been a major concern for conventional computer display devices mounted on eyeglasses) can be solved. Furthermore, the imaging apparatus may be an imaging apparatus capable of limiting the in-focus range to a (short) constant range regardless of the state of the computer display device according to the present teachings. In addition, when limiting the in-focus range to a constant range regardless of the state of the computer display device, the notifying means desirably notifies third parties (nearby people) that the in-focus range is being limited to a constant range even when the user is wearing the computer display device and performing an operation other than an operation for setting reference data described above and an operation for normal camera photography or even when the computer display device is in a standby state. Furthermore, for example, when the imaging apparatus is not operating or when the computer display device is not operating, a notification that the imaging apparatus or the computer display device is not operating is desirably made by the notifying means. The notification by the notifying means at this point may be similar to the notification described above for notifying third parties (nearby people) that the in-focus range is being limited to a constant range or a different notification may be used by, for example, changing the color of a light such as an LED.

In addition or in the alternative, in the second embodiment or the third embodiment described above, a configuration may be adopted in which, during a character input process or a screen display process, the imaging apparatus recognizes a finger as the subject (object) and automatically and continuously brings the recognized finger into focus.

Figure 20:
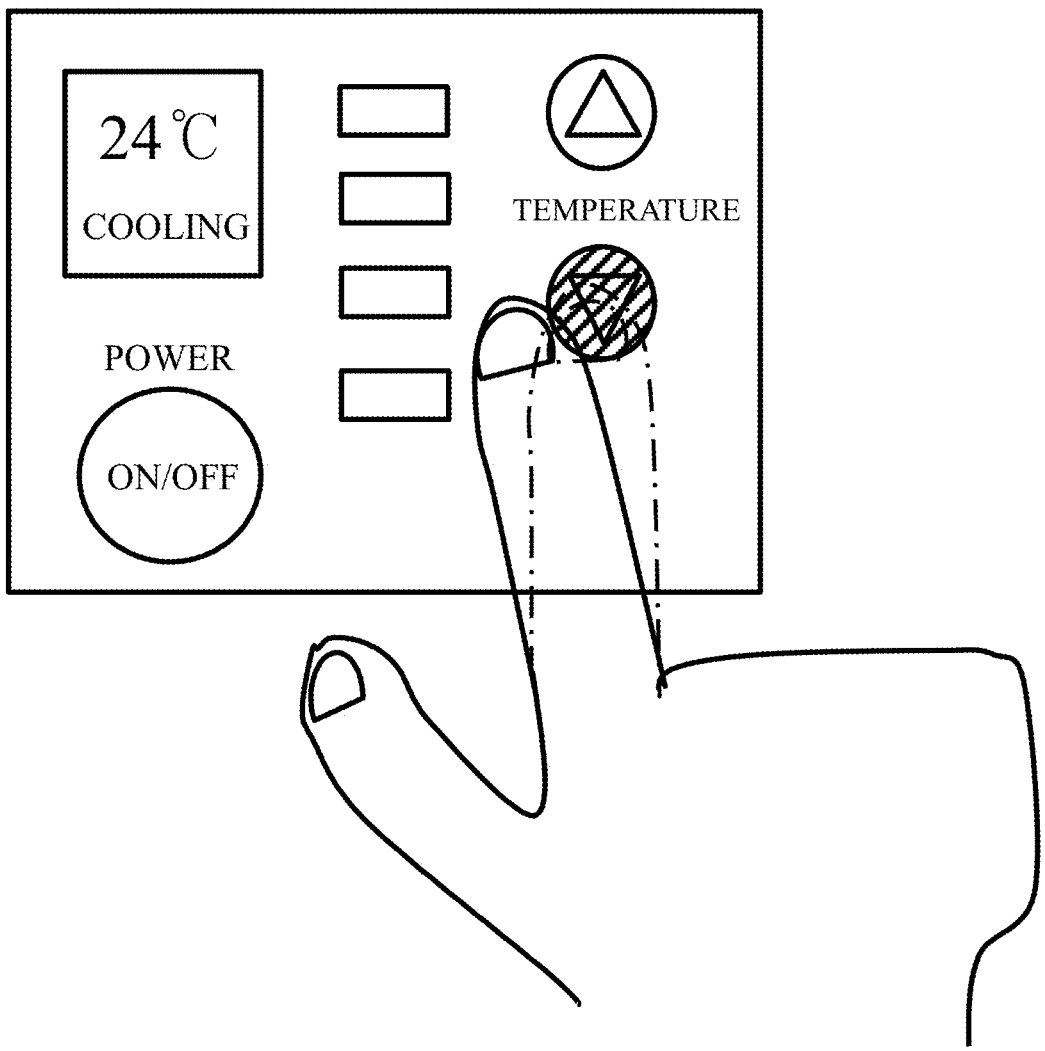
FIG. 20 is a diagram showing an embodiment in which a remote control screen of an air conditioner is used as the original screen and a user performs an operation on a visual (virtual) confirmation screen corresponding to the remote control screen.
Figure 21A:
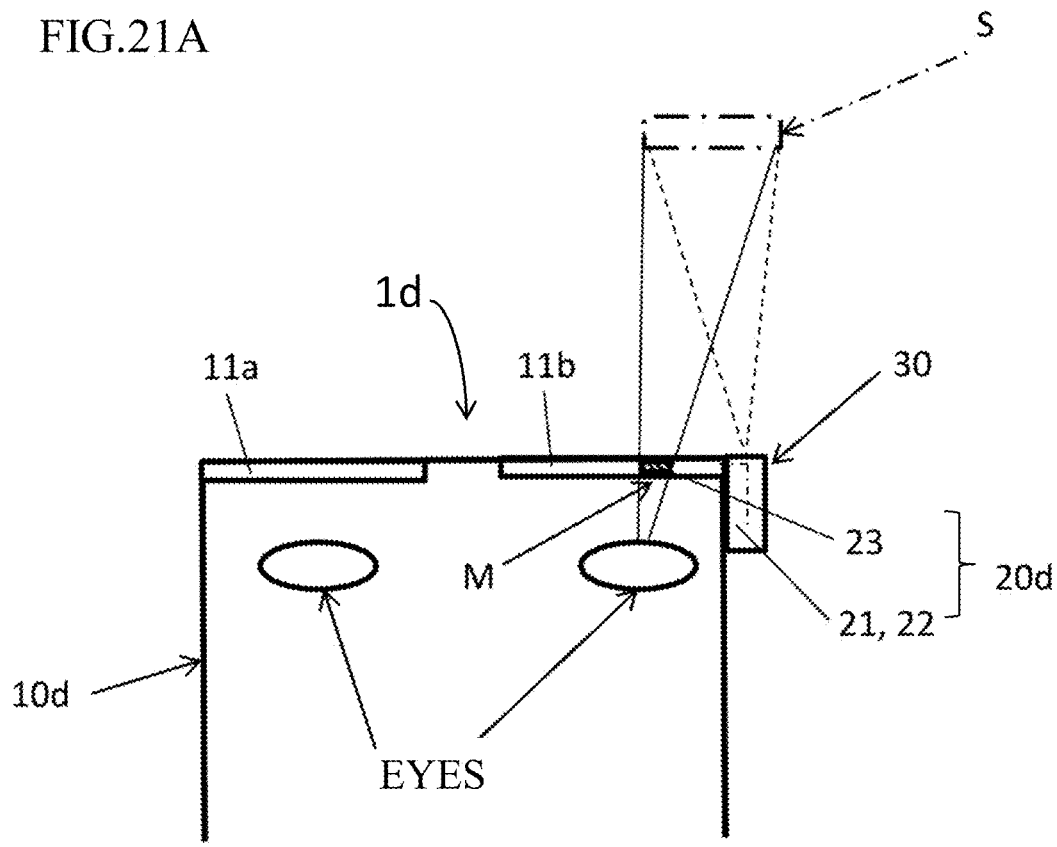
FIG. 21A is a schematic plan view of a computer display device mounted on eyeglasses according to a modification of the first embodiment of the present teachings.
Figure 21B:
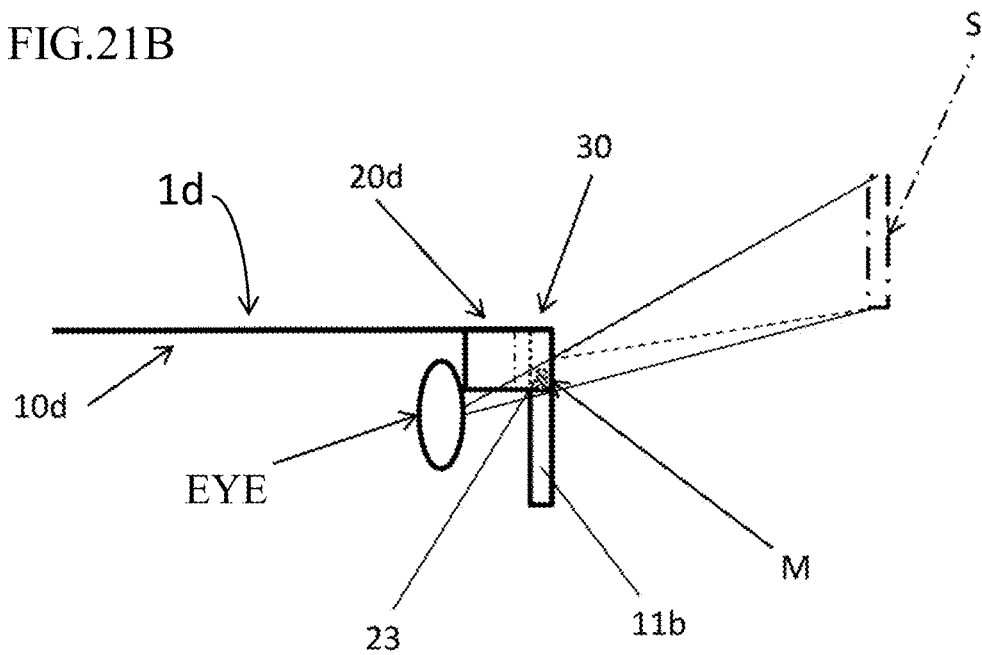
FIG. 21B is a schematic right side view of the same.

In addition or in the alternative, in the above-described embodiments and modifications, the storage unit may store, as one or more original screens, e.g., (i) an operation screen for a mobile terminal such as a mobile phone, a smartphone, a tablet, and a laptop computer, (ii) an operation screen for an information terminal such as a personal computer, a remote controller screen for a household electric appliance such as a lighting fixture, a television set, an air conditioner, and a security system, or (iii) a control panel screen for electric equipment such as a car stereo, a car navigation system, and/or an air conditioner. In such embodiments, the user causes the operation screen or the like described above to be displayed on the display apparatus as the original screen by making a voice command or by performing a manual operation using a touchpad, the visual confirmation screen or the like. Then, when performing an operation using a finger on the visual confirmation screen that corresponds to the original screen, a control unit (remote control unit) generates a command signal (command) indicating the contents of the operation and wirelessly transmits the generated command signal to the mobile terminal (mobile computing device) or the like described above via a communicating unit, e.g., wirelessly. In this manner, the mobile terminal (mobile computing device) or the like described above can be remotely operated. In other words, the computer display device according to the present teachings can also be used as a remote controller for a remotely-controllable apparatus such as an air conditioner. FIG. 20 is a diagram showing an embodiment in which a screen (remote controller screen) corresponding to an operating unit of a remote controller of an air conditioner is used as the original screen and the user performs an operation on a visual confirmation screen that corresponds to the remote controller screen. As shown in FIG. 20, when the user operates, using a finger, a temperature-setting button on the visual confirmation screen so as to lower the temperature, the control unit generates a command for lowering the set temperature and transmits the command by infrared communication to the air conditioner via the communicating unit. In this manner, the user can conveniently lower the set temperature of the air conditioner.

In addition or in the alternative, in all of the above-described embodiments and modifications, the computer display device according to the present teachings is mounted on the head of a user in the form of eyeglasses. However, computer display devices according to the present teachings are not limited to computing devices that are used while being hooked around the ears as long as a display apparatus, an imaging apparatus, and the like are provided, and may be any kind of wearable computer device worn on the back of the head, the front of the head, or the top of the head such as a headset type terminal or a head-mounted display (HMD) type terminal.

In addition or in the alternative, the computer display device according to the present teachings may be an eyeglass-mounted computing device. In this case, by mounting the computer display device according to the present teachings to an eyeglass frame or one of the temples to be worn by the user, the computer display device according to the present teachings can be mounted or worn on the head.

As was described above, with the computer display devices according to the present teachings, when a user performs an operation on a visual confirmation screen using a finger, a mark attached to the finger or an input instructing tool (collectively, "an indicator"), an input control unit recognizes the contents of the inputted instruction, which corresponds to the operation performed by the finger or the input instructing tool (indicator), based on: (i) data concerning the contents of the operation performed by the finger or the input instructing tool (indicator) as obtained by a determination made by an operation determining unit, (ii) positional data of the finger or the input instructing tool (indicator) generated by a positional data generating unit, and (iii) reference data concerning the visual confirmation screen that is stored in a storage unit. The input control unit then controls (selects, generates) an original screen to be displayed on a display apparatus in accordance with the recognized contents of the inputted instruction. Therefore, by using the wearable computer display device according to the present teachings, the user can easily and accurately perform character input operations and various screen operations including enlargement and reduction by operating a visual confirmation screen in a manner similar to a conventional smartphone or a tablet computer. Accordingly, the present teachings can be applied to computer display devices that are worn by a user in a similar manner to eyeglasses.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved wearable computers, such as computer display devices, eyeglass-type computer displays, "smartglasses", etc.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present invention have been described in the context of a device or apparatus, it is to be understood that these aspects also represent a description of a corresponding method, so that a block or a component of a device or apparatus is also understood as a corresponding method step or as a feature of a method step. In an analogous manner, aspects which have been described in the context of or as a method step also represent a description of a corresponding block or detail or feature of a corresponding device.

Depending on certain implementation requirements, exemplary embodiments of the invention, such as the control unit and/or functional blocks thereof may be implemented in hardware and/or in software. The implementation can be performed using a digital storage medium, for example a ROM, a RAM, a PROM, an EPROM, an EEPROM or a flash memory, on which electronically readable control signals are stored, which interact or can interact with a programmable hardware component such that the respective method is performed.

A programmable hardware component can be formed by one or more of a processor, a computer processor (CPU=central processing unit), a graphics processor (GPU=graphics processing unit), a computer, a computer system, an application-specific integrated circuit (ASIC), an integrated circuit (IC), a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program(s) for performing one of the methods described herein is (are) recorded.

In general, exemplary embodiments of the present invention are implemented as a program, firmware, computer program, or computer program product including a program, or as data, wherein the program code or the data is operative to perform one of the methods if the program runs on a processor (e.g., a microprocessor) or other programmable hardware component. The program code or the data can for example also be stored on a machine-readable carrier or data carrier. The program code or the data can be, among other things, source code, machine code, bytecode or another intermediate code.

A further exemplary embodiment is a data stream, a signal sequence, or a sequence of signals which represents the program for performing one of the methods described herein. The data stream, the signal sequence, or the sequence of signals can for example be configured to be transferred via a data communications connection, for example via the Internet or another network. Exemplary embodiments are thus also signal sequences which represent data, which are intended for transmission via a network or a data communications connection, wherein the data represent the program.

A program according to an exemplary embodiment can implement one of the methods during its performance, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes using displays, projectors, etc.

In the present disclosure, the terms "eyeglasses", "eyeglass frame" and "eyeglass main body" have been utilized to describe all elements of the eyeglasses (spectacles). However, it is noted that eyeglasses generally include a frame, which holds right and left lenses, and two temples, which are identical long and narrow arms that attach to the ends of the frame, e.g., with or without hinges, and are designed to extend over the ears to keep eyeglasses in place on the user's head. A bridge may be provided in the frame between the two lenses. Furthermore, nose pads may be attached to the frame or directly to the lens and are designed to rest on the user's nose. Instead of a frame, the eyeglasses may be "frameless", in which case the lenses are connected directly to the bridge and the temples. The various components disclosed above, such as the imaging apparatus, display and hardware, may be attached to any one of these components, but the display is preferably attached to the frame or one of the lens, and the hardware, including e.g., the imaging apparatus (camera) and a touchpad, is preferably attached to the temples.

An additional embodiment of the present teachings is a device configured to be worn on a head of a user and used together with an indicator selected from the group consisting of a finger of the user, a mark attached to the finger, and an input instructing tool. The device preferably comprises an eyeglass having a frame and two temples attached thereto. A display is mounted on the eyeglass, e.g., on the frame, and is configured to generate a virtual screen viewable by the user. A camera is mounted on the eyeglass, e.g. on one of the temples, and is configured to capture images in front of the user. A central processing unit is mounted on the eyeglass, e.g., on one of the temples, and comprises a microprocessor in communication with a memory. The memory stores one or more microprocessor-readable instructions (programs) that, when executed by the microprocessor:

cause the camera to capture images of the indicator performing an operation on the virtual screen;
recognize the indicator on the captured images and generate indicator image data;
determine the operation being performed by the indicator using the indicator image data, e.g., by tracking movement of the indicator;
generate positional data of the indicator in an imaging range of the camera using the indicator image data;
generate reference data concerning the virtual screen by detecting a reference data setting operation performed by the indicator at one or more predetermined positions on the virtual screen using said positional data;
store the reference data in the memory;
cause the display to generate a virtual screen in accordance with the determined operation, the generated positional data and the stored reference data.

EXPLANATION OF THE REFERENCE NUMERALS 1, 1a, 1b, 1c, 1d, 1e Computer display device
10, 10d Eyeglass main body
11, 11a, 11b Lens section
20, 20d Display apparatus
21 Small projector
22 Optical system
23 Half mirror
30, 30a, 30c Imaging apparatus
31 Camera unit
32 Image processing unit
33, 33a, 33c Camera control unit
331 Autofocus control unit
40 Touchpad unit
50 Microphone unit
60 Speaker unit
70, 70a, 70b, 70c Control unit
71 Display control unit
72, 72a Image data extracting unit
73 Operation determining unit
74, 74b Positional data generating unit
75, 75c Reference data generating unit
76, 76c Input control unit
77b Deviation correcting unit
78c Distance determining unit
80 Communicating unit
90 Storage unit
200 Character input screen
201 Character input screen (original screen for setting reference data)
210 Keyboard image
220 Display area
221 Search screen
2211 Keyword input section
2212 Search result display section

I claim:

1. A device configured to be worn like eyeglasses by a user, the device comprising:
an eyeglass main body;
a display apparatus provided on the eyeglass main body and configured to display an original screen corresponding to a visual confirmation screen that appears to the user to be floating in midair;
an imaging apparatus provided on the eyeglass main body, and including an autofocus control unit configured to automatically bring a subject into focus, the imaging apparatus being configured to calculate, when an image of the subject that has been automatically brought into focus by the autofocus control unit is captured, data concerning the distance to the captured subject and to output the calculated distance data together with image data obtained by the imaging apparatus;
an image data extracting unit configured to: (i) determine, when the image of the subject that has been automatically brought into focus is captured by the imaging apparatus, whether or not the subject is a finger or an input instructing tool based on the image data and to extract a subset of the image data in which the finger or the input instructing tool is present;
an operation determining unit configured to determine, when the imaging apparatus captures the image of the finger or the input instructing tool used by the user to perform the operation on the visual confirmation screen, contents of the operation performed by the finger or the input instructing tool, based on the subset of the image data extracted by the image data extracting unit;
a positional data generating unit configured to generate, when the imaging apparatus captures the image of the finger or of the input instructing tool used by the user to perform the operation on the visual confirmation screen, positional data of the finger or of the input instructing tool in an imaging range of the imaging apparatus, based on the image data for which the operation determining unit has determined the operation performed by the finger or the input instructing tool is a prescribed operation;

a reference data generating unit configured to generate, when the user performs an operation using the finger or the input instructing tool at at least three predetermined positions on the visual confirmation screen, data specifying a reference screen that corresponds to the visual confirmation screen in a three-dimensional space using (i) at least three pieces of positional data of the finger or of the input instructing tool generated by the positional data generating unit based on the image data for which the operation determining unit has determined the operation at each of the prescribed positions is the prescribed operation, and (ii) distance data sent together with the image data used when generating the pieces of positional data, and to store the generated data specifying the reference screen as reference data in a storage unit;

a distance determining unit configured to determine, when the image of the subject that has been automatically brought into focus is captured by the imaging apparatus upon the user performing an operation on the visual confirmation screen using the finger or the input instructing tool after the reference data has been generated by the reference data generating unit, whether or not the finger or the input instructing tool is positioned within a range of a predetermined, approximately-constant distance from the reference screen based on: (i) the positional data of the finger or of the input instructing tool generated by the positional data generating unit based on the image data for which the operation determining unit has determined the operation performed by the finger or the input instructing tool is the prescribed operation, (ii) the distance data associated with the image data used when generating the positional data of the finger or of the input instructing tool, and (iii) the reference data that specifies the reference screen corresponding to the visual confirmation screen and which is stored in the storage unit; and an input control unit configured to determine, when the user performs the operation using the finger or the input instructing tool on the visual confirmation screen and the distance determining unit has determined that the finger or the input instructing tool is located within the range of the predetermined, approximately-constant distance from the reference screen, contents of an inputted instruction corresponding to the operation performed by the finger or the input instructing tool based on: (i) the data concerning the contents of the operation performed by the finger or the input instructing tool determined by the operation determining unit, (ii) the positional data of the finger or of the input instructing tool generated by the positional data generating unit based on the image data used to make the determination, (iii) the distance data associated with the image data used to make the determination, and (iv) the reference data that specifies the reference screen corresponding to the visual confirmation screen and which is stored in the storage unit, and to control the original screen to be displayed on the display apparatus in accordance with the determined contents of the inputted instruction.

2. The device according to claim 1, wherein the original screen displayed on the display apparatus is a character input screen including a keyboard image and a display area for displaying inputted characters.

3. The device according to claim 1, wherein
the original screen displayed on the display apparatus includes a screen corresponding to an operating unit of a remote controller for a remotely-controllable apparatus, and
the device further comprises a remote control unit configured to generate, when an operation is performed on the screen corresponding to the operating unit of the remote controller, a command signal representative of the contents of the operation and to wirelessly transmit the generated command signal to the remotely-controllable apparatus.

4. The device according to claim 1, wherein
the imaging apparatus is configured to limit an in-focus range to a constant range, and
the device further comprises notifying means for notifying a third party of the fact that the in-focus range is being limited to the constant range.

5. The device according to claim 1, wherein
the display apparatus includes a projector having a display device, an optical system, and a half mirror onto which the original screen displayed on the display device is projected via the optical system, and
the half mirror is embedded in or integrated with a prism arranged in front of a lens section of the eyeglass main body or is affixed to a prism arranged in front of the lens section of the eyeglass main body.

6. The device according to claim 1, wherein
the display apparatus includes a projector having a display device, an optical system, and a half mirror onto which the original screen displayed on the display device is projected via the optical system, and
the half mirror is affixed to a lens section of the eyeglass main body or is embedded in or integrated with the lens section of the eyeglass main body.

7. The device according to claim 1, wherein
the display apparatus includes a projector having a display device, an optical system, and a holographic sheet or a holographic film onto which the original screen displayed on the display device is projected via the optical system, and
the holographic sheet or the holographic film is affixed to a lens section of the eyeglass main body or is embedded in or integrated with the lens section of the eyeglass main body.

8. The device according to claim 1, wherein
the operation determining unit is configured to determine contents of an operation performed by the finger based on movement of a predetermined mark attached to a fingertip of the finger, and
the positional data generating unit is configured to generate positional data of the mark as the positional data of the finger.

9. The device according to claim 1, wherein the device is configured to be used by the user while being mounted on any portion of the head other than the ears instead of being worn like eyeglasses.

10. The device according to claim 1, wherein the eyeglass main body comprises a frame and two temples, the display apparatus being mounted on the frame and the imaging apparatus being mounted on one of the temples.

* * * * *